United States Patent
Unno

(10) Patent No.: US 12,046,732 B2
(45) Date of Patent: *Jul. 23, 2024

(54) ASSEMBLED BATTERY AND MANUFACTURING METHOD FOR THE SAME

(71) Applicant: AESC Japan Ltd., Zama (JP)

(72) Inventor: Makoto Unno, Zama (JP)

(73) Assignee: AESC JAPAN LTD., Zama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/302,735

(22) Filed: Apr. 18, 2023

(65) Prior Publication Data

US 2023/0253647 A1 Aug. 10, 2023

Related U.S. Application Data

(63) Continuation of application No. 16/656,402, filed on Oct. 17, 2019, now Pat. No. 11,677,108.

(30) Foreign Application Priority Data

Oct. 19, 2018 (JP) .................................. 2018-197981

(51) Int. Cl.
*H01M 10/6554* (2014.01)
*H01M 10/6555* (2014.01)
(Continued)

(52) U.S. Cl.
CPC ..... *H01M 10/6554* (2015.04); *H01M 50/564* (2021.01); *H01M 50/176* (2021.01);
(Continued)

(58) Field of Classification Search
CPC ................................................ H01M 10/6554
See application file for complete search history.

(56) References Cited

U.S. PATENT DOCUMENTS

| 6,106,973 A | 8/2000 | Sonozaki et al. |
| 8,465,864 B1 | 6/2013 | Kwak et al. |

(Continued)

FOREIGN PATENT DOCUMENTS

| JP | H10214606 A | 8/1998 |
| JP | 2000090975 A | 3/2000 |

(Continued)

OTHER PUBLICATIONS

Japanese Patent Office, Office Action Issued in Application No. 2018-197981, Aug. 16, 2022, 12 pages.

*Primary Examiner* — Basia A Ridley
*Assistant Examiner* — Heng M. Chan
(74) *Attorney, Agent, or Firm* — McCoy Russell LLP

(57) ABSTRACT

A film-covered battery includes a coverage case having a film covering material and a power generation element contained in the coverage case. The coverage case has a first sealing part that guides a terminal and a second sealing part that does not guide a terminal. The second sealing part is formed on at least one face (face F) with a maximum area among exterior faces of the power generation element. The assembled battery has a third sealing part being a part of the second sealing part and overlapping the power generation element. In the assembled battery, a heat dissipation plate is placed on the face F where the third sealing part is formed. A projection area of the third sealing part and the heat dissipation plate on the face F occupies 40% or more of the face F.

3 Claims, 17 Drawing Sheets

(51) Int. Cl.
*H01M 50/564* (2021.01)
*H01M 50/176* (2021.01)
*H01M 50/548* (2021.01)
*H01M 50/553* (2021.01)
*H01M 50/557* (2021.01)

(52) U.S. Cl.
CPC ........ *H01M 50/548* (2021.01); *H01M 50/553* (2021.01); *H01M 50/557* (2021.01)

(56) References Cited

U.S. PATENT DOCUMENTS

2011/0159340 A1* 6/2011 Hu .................. H01M 10/617
429/120
2015/0171382 A1 6/2015 Suh et al.

FOREIGN PATENT DOCUMENTS

| | | |
|---|---|---|
| JP | 2002033084 A | 1/2002 |
| JP | 2006196230 A | 7/2006 |
| JP | 2011175849 A | 9/2011 |
| JP | 2012164476 A | 8/2012 |
| JP | 2015118938 A | 6/2015 |
| JP | 2015165460 A | 9/2015 |
| JP | 2020068052 A | 4/2020 |
| KR | 20080074239 A | 8/2008 |

* cited by examiner

ASSEMBLED BATTERY AND MANUFACTURING METHOD FOR THE SAME

CROSS-REFERENCE TO RELATED APPLICATIONS

The present application is a continuation of U.S. Non-Provisional patent application Ser. No. 16/656,402, entitled "ASSEMBLED BATTERY AND MANUFACTURING METHOD FOR THE SAME", and filed on Oct. 17, 2019. U.S. Non-Provisional patent application Ser. No. 16/656,402 is based upon and claims the benefit of priority from Japanese patent application No. 2018-197981, filed on Oct. 19, 2018. The entire contents of each of the above-listed applications are incorporated by reference for all purposes.

TECHNICAL FIELD

The present disclosure relates to an assembled battery and a manufacturing method for the same.

BACKGROUND

Secondary batteries typified by lithium-ion batteries are mounted on electric bicycles, electric motorcycles, automobiles and the like recently, and there is an increasing demand for high-performance secondary batteries with a high energy density, long life, and a high safety level. To meet this demand, a film-covered battery in which a lightweight and flexible film covering material having a highly flexible shape is used as an exterior case is known. Further, to meet the need for higher power, an assembled battery formed by connecting a plurality of film-coated batteries is known.

For example, Japanese Unexamined Patent Application Publication No. H10-214606 discloses a technique related to an exterior case structure of a film-covered battery. FIG. 19 is a view showing the film-covered battery disclosed therein, and FIG. 20 is a cross-sectional view along line XX-XX of FIG. 19. In the film-covered battery shown in FIGS. 19 and 20, a power generation element 7 is covered with a laminate cover 5 having a laminate film 5A, and a collector terminal 6 is guided to the outside of the laminate cover 5. The power generation element 7 is composed of a positive electrode 1, a negative electrode 2, and an electrolyte layer 3 placed between them, and the positive electrode 1 and the negative electrode 2 are each connected to the collector terminal 6. Further, in this film-covered battery, a sealing part 4 made up of sealing parts 4A and 4B is bonded above the power generation element 7.

SUMMARY

When using a secondary battery, it is necessary to protect a power generation element contained in an exterior case. Specifically, due to impact such as drop and vibration, parts such as a positive electrode, a negative electrode and a separator are subject to deviation or deformation from the original shape, which can hinder the performance of the secondary battery. It is thus important to protect them with an exterior case.

Further, to achieve a long life and high safety of a film-covered battery, it is necessary to fix the film-covered battery by evenly pressing it at a specified pressure. As a secondary battery including a film-covered battery is discharged and charged for use for a long period of time, parts of the secondary battery react to each other in any way and generate gas. The gas generated inside the secondary battery causes the secondary battery to swell, affecting its life, battery characteristics and safety.

However, according to the technique disclosed in Japanese Unexamined Patent Application Publication No. H10-214606, when mounting an assembled battery with a plurality of film-covered batteries stacked together, each having a sealing part overlapping a power generation element, on equipment, there is a gap due to a difference in height between the sealing part and a part other than the sealing part of a coverage case of the film-covered battery. Such a gap makes it impossible to evenly press a face with the maximum area of the power generation element, which can cause degradation of properties such as long life and high safety.

On the other hand, if the above-mentioned gap is filled in the process of producing an assembled battery by stacking a plurality of film-covered batteries by applying the technique disclosed in Japanese Unexamined Patent Application Publication No. H10-214606, heat is trapped inside, resulting in poor heat dissipation.

An object of the preset disclosure is to provide an assembled battery including a film-covered battery that solves the above-described problem. The above problem is that, in an assembled battery including film-covered batteries stacked in layers, it is not possible to achieve good heat dissipation and high energy density with improved volumetric efficiency while fixing the film-covered batteries in a right way.

To solve the above-described problem, an assembled battery according to a first aspect of the present disclosure is an assembled battery including a plurality of film-covered batteries stacked in layers, wherein each of the film-covered batteries includes a coverage case having a film covering material and a power generation element contained in the coverage case, the coverage case has a first sealing part that guides a terminal and a second sealing part that does not guide a terminal, the second sealing part is formed on at least one face with a maximum area among exterior faces of the power generation element, in the assembled battery, where a part of the second sealing part overlapping the power generation element is a third sealing part, a heat dissipation plate is placed on the at least one face with the maximum area among exterior faces of the power generation element, the third sealing part being formed on the at least one face, and a projection area of the third sealing part and the heat dissipation plate onto the at least one face with the maximum area is 40% or more of the at least one face with the maximum area.

A manufacturing method for an assembled battery according to a second aspect of the present disclosure is a manufacturing method for an assembled battery that manufactures the assembled battery by stacking a plurality of film-covered batteries, wherein each of the film-covered batteries includes a coverage case having a film covering material and a power generation element contained in the coverage case, the coverage case has a first sealing part that guides a terminal and a second sealing part that does not guide a terminal, the second sealing part is formed on at least one face with a maximum area among exterior faces of the power generation element, the manufacturing method comprises placing a heat dissipation plate on the at least one face with the maximum area among exterior faces of the power generation element, a third sealing part being formed on the at least one face, the third sealing part being a part of the second sealing part overlapping the power generation element, and a projection area of the third sealing part and the heat dissipation plate onto the at least one face with the maximum area is 40% or more of the at least one face with the maximum area.

BRIEF DESCRIPTION OF DRAWINGS

The above and other aspects, features and advantages of the present disclosure will become more apparent from the following description of certain exemplary embodiments when taken in conjunction with the accompanying drawings, in which.

DETAILED DESCRIPTION

Embodiments of the present invention are described hereinafter with reference to the drawings. It should be noted that, in the embodiments, the same elements are denoted by the same reference symbols, and the redundant explanation thereof is omitted.

First Embodiment

Figure 1:
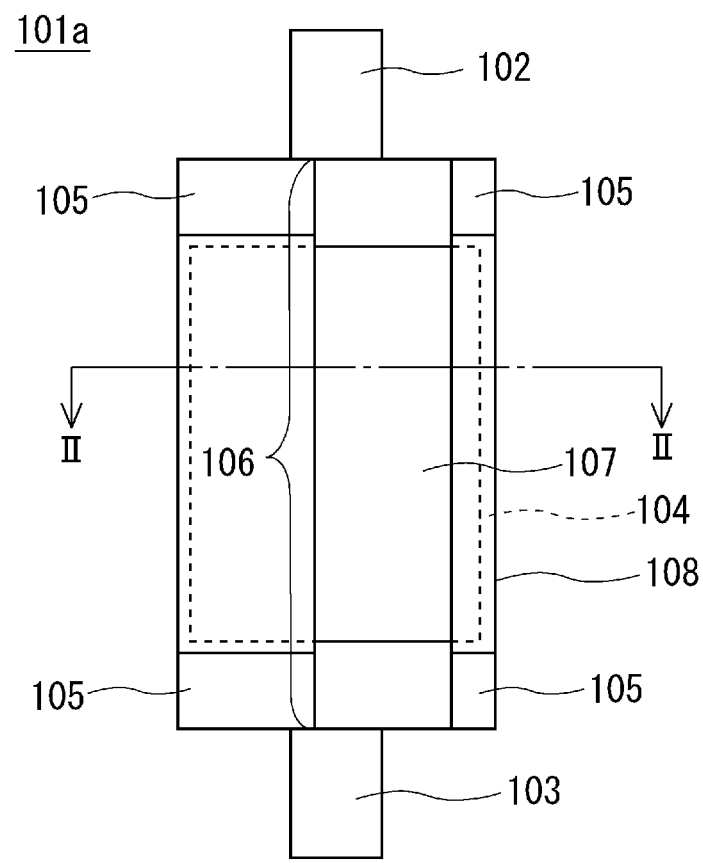
FIG. 1 is a plan view showing an example structure of a film-covered battery included in an assembled battery according to a first embodiment.

Prior to describing an assembled battery according to a first embodiment, a film-covered battery included in this assembled battery is described hereinafter with reference to FIGS. 1 to 3. FIG. 1 is a plan view showing an example structure of the film-covered battery included in the assembled battery according to the first embodiment, and FIG. 2 is a cross-sectional view along line II-II in FIG. 1.

Figure 2:
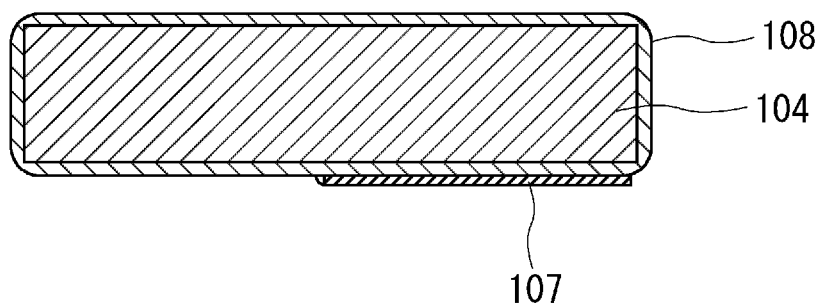
FIG. 2 is a cross-sectional view along line II-II showing an example structure of the film-covered battery shown in FIG. 1.

As shown in FIGS. 1 and 2, a film-covered battery 101a included in the assembled battery according to this embodiment has a structure in which a power generation element 104 is covered with a film covering material 108, a first terminal 102 and a second terminal 103 are guided to the outside, and those parts are sealed. In this manner, in the film-covered battery 101a, the power generation element 104 is contained in a coverage case (exterior container) having the film covering material 108. Note that, although the film covering material 108 is used as the coverage case in FIG. 1 or the like, the coverage case may be in any form as long as it has a film covering material.

The above-described sealing is done by a sealing part, which at least includes a first sealing part 105 and a second sealing part 106. Thus, the coverage case at least has the first sealing part 105 and the second sealing part 106. The first sealing part 105 is a sealing part that guides terminals (which are the first terminal 102 and the second terminal 103 in this example). The second sealing part 106 is a sealing part that does not guide terminals. The first terminal 102 is connected to one of a positive electrode and a negative electrode included in the power generation element 104, and the second terminal 103 is connected to the other one of them.

As shown in FIGS. 1 and 2, the power generation element 104 has a rectangular shape. The second sealing part 106 is formed by bonding the reverse side of the film covering material 108 to the front side thereof on one face with the maximum area of the power generation element 104 among the exterior faces of the power generation element 104. Note that, although the description of this embodiment and the subsequent embodiments is based on the assumption that the power generation element 104 basically has a rectangular shape, it may have a nearly rectangle shape, for example, as long as the above-described one face with the maximum area can be defined.

In the following description, a part of the second sealing part 106 which overlaps the power generation element 104 is referred to as a third sealing part 107. To be more specific, the third sealing part 107 is a part of the second sealing part 106 which overlaps (positionally overlaps) the power generation element 104.

Another example of the film-covered battery 101a is described hereinafter with reference to FIG. 3. FIG. 3 is a view showing another example of the film-covered battery 101a shown in FIG. 1, and is a cross-sectional view along line II-II of FIG. 1. The film-covered battery 101a shown in FIG. 3 is different from the example structure in FIG. 2 in that the same sides of the film covering material 108 are bonded together in the second sealing part 106 on one face with the maximum area of the power generation element 104. The other parts in the example structure of FIG. 3 and their effects are the same as those in the example structure of FIG. 2.

Figure 3:
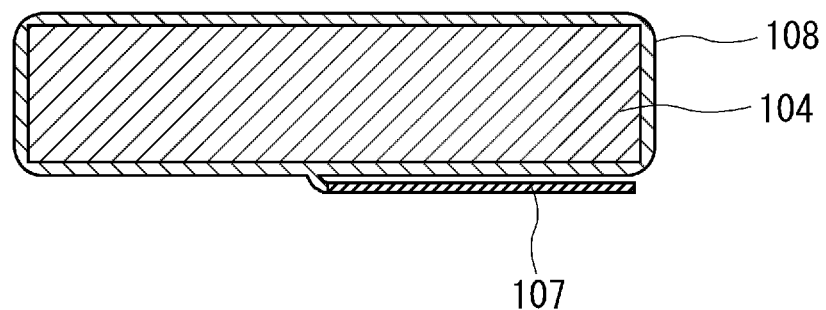
FIG. 3 is a cross-sectional view along line II-II showing another example of the film-covered battery shown in FIG. 1.

Because the same sides of the film covering material 108 are bonded together, a gap is shown between a non-boned part and a bonded part in the third sealing part 107 of FIG. 3, which is different from the third sealing part 107 of FIG. 2. Note that, however, the covering material may be folded with no gap except for a fold line or may be folded with substantially no gap including a fold line. The same applies to the drawings, such as FIG. 4, described later.

Figure 4:
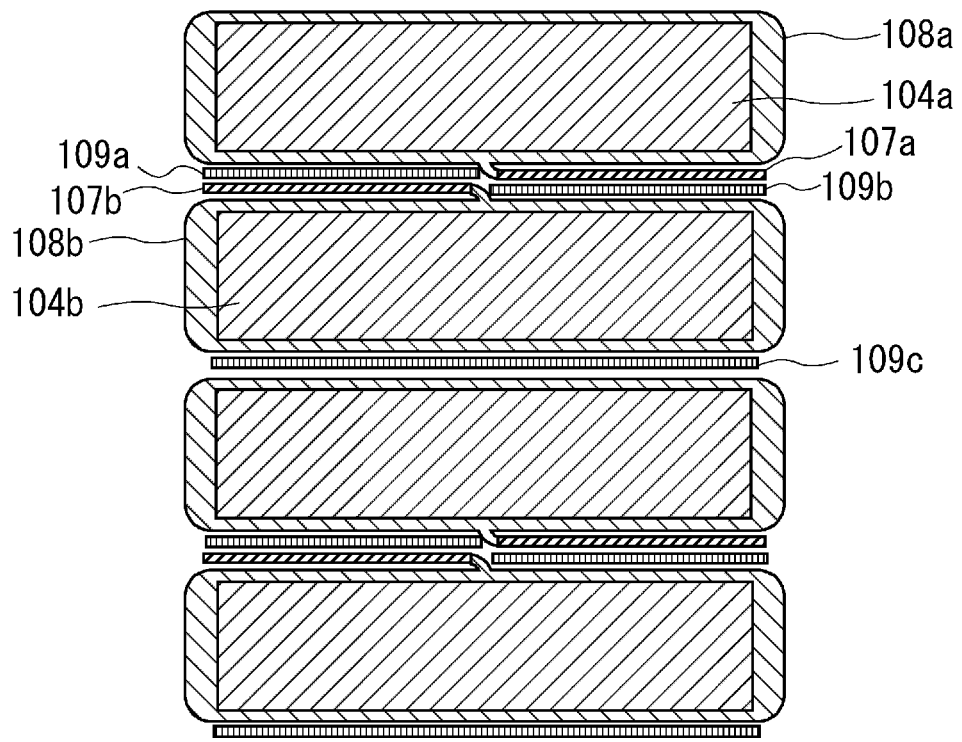
FIG. 4 is a cross-sectional view showing an example structure of the assembled battery according to the first embodiment.

The assembled battery according to this embodiment is described hereinafter with reference also to FIG. 4. FIG. 4 is a cross-sectional view showing an example structure of the assembled battery (an example of the structure of the assembled battery) according to the first embodiment, and it is a cross-sectional view showing an example structure of the assembled battery in which a plurality of film-covered batteries 101*a* in FIG. 3 are stacked together.

As shown in FIG. 4, an assembled battery 100*a* according to this embodiment is a battery in which a plurality of film-covered batteries 101*a* shown in FIG. 1 and FIG. 3 are stacked together, i.e., a battery in which a plurality of such film-covered batteries 101*a* are stacked in layers.

The power generation element 104, the film covering material 108 and the third sealing part 107 included in one film-covered battery among the film-covered batteries 101*a* to be stacked in layers are referred to hereinafter as a power generation element 104*a*, a film covering material 108*a* and a third sealing part 107*a*, respectively. Likewise, those included in a film-covered battery adjacent to the above-described one film-covered battery are referred to hereinafter as a power generation element 104*b*, a film covering material 108*b* and a third sealing part 107*b*, respectively.

Particularly, in the assembled battery 100*a*, a plurality of film-covered batteries 101*a* are stacked in layers in such a way that the third sealing part 107*a* and the third sealing part 107*b* do not overlap in the stacking direction and the surfaces having the third sealing parts 107*a* and 107*b* face each other (which is referred to as a facing state). Specifically, in the assembled battery 100*a*, the adjacent film-covered batteries 101*a* are placed in such a way that the third sealing parts 107*a* and 107*b* face each other and the projection positions of them in the stacking direction do not overlap. Further, in the assembled battery 100*a*, the adjacent film-covered batteries 101*a* are stacked in layers in such a way that the surfaces not having the third sealing parts 107 face each other (which is referred to as a non-facing state). In this manner, the adjacent film-covered batteries 101*a* are stacked in either one of the facing state or the non-facing state in the assembled battery 100*a*.

Although the cross-sectional view of FIG. 4 does not show the first terminal 102 and the second terminal 103, the film-covered batteries 101*a* flipped vertically are alternately stacked so that the third sealing parts 107*a* and 107*b* face each other, and they are connected in series in the assembled battery 100*a*. The vertical flipping in this example is a rotation about a line connecting the first terminal 102 and the second terminal 103. It is thus preferable to interchange the polarity of the first terminal 102 and the second terminal 103 alternately in the film-covered batteries 101*a* to be stacked in layers. Specifically, the film-covered battery 101*a* where the first terminal 102 is a positive terminal and the second terminal 103 is a negative terminal and the film-covered battery 101*a* where the first terminal 102 is a negative terminal and the second terminal 103 is a positive terminal are produced. Then, those film-covered batteries 101*a* are alternately stacked in such a way that the third sealing parts 107*a* and 107*b* face each other. Note that, however, the film-covered batteries 101*a* may be connected in parallel. In this case, the above-described interchanging of the polarity is not done, and the film-covered batteries 101*a* are alternately stacked so that the third sealing parts 107*a* and 107*b* face each other.

In the assembled battery 100*a* according to this embodiment, heat dissipation plates 109*a* and 109*b* are placed between the adjacent film-covered batteries 101*a* as shown in FIG. 4. Note that, because the heat dissipation plates are placed between the adjacent film-covered batteries in the assembled battery according to this embodiment and the other embodiments, the adjacent film-covered batteries are in contact or not in contact depending on a structure. FIG. 4 shows an example in which the adjacent film-covered batteries are in contact with each other between the non-boned part and the bonded part.

The positions of the heat dissipation plates 109*a* and 109*b* are described more specifically. Note that, when describing a common feature of the heat dissipation plates 109*a* and 109*b*, they are referred to collectively as the heat dissipation plate 109.

The heat dissipation plate 109*a* is placed (stacked) on one face with the maximum area among the exterior faces of the power generation element 104*a*, which is the face where the third sealing part 107*a* is formed. Likewise, the heat dissipation plate 109*b* is placed on one face with the maximum area among the exterior faces of the power generation element 104*b*, which is the face where the third sealing part 107*b* is formed.

As two or more heat dissipation plates 109 may be placed between the adjacent film-covered batteries 101*a*, just like the two heat dissipation plates 109*a* and 109*b* shown in FIG. 4. Stated differently, both of the heat dissipation plates 109*a* and 109*b* are placed on one face having the maximum area among the exterior faces of the power generation element 104*a*, which is the face where the third sealing part 107*a* is formed. Likewise, both of the heat dissipation plates 109*a* and 109*b* are placed on one face having the maximum area among the exterior faces of the power generation element 104*b*, which is the face where the third sealing part 107*b* is formed.

The heat dissipation plate 109*a*, which is a part of the heat dissipation plate, is placed not to overlap the third sealing part 107*a* of one film-covered battery between the adjacent film-covered batteries. Likewise, the heat dissipation plate 109*b*, which is another part of the heat dissipation plate, is placed not to overlap the third sealing part 107*b* of the other film-covered battery between the adjacent film-covered batteries.

Further, as shown in FIG. 4, it is preferable that the thickness of the heat dissipation plate 109*a* and the thickness of the third sealing part 107*a* are substantially the same, and the thickness of the heat dissipation plate 109*b* and the thickness of the third sealing part 107*b* are substantially the same. This is with a view to achieve a uniform thickness of one film-covered battery 101*a* together with the heat dissipation plate 109*a*, which allows pressure to be evenly applied when pressing the film-covered battery 101*a* and the adjacent film-covered battery 101*a* stacked together. Note that, by taking a difference in elasticity between the heat dissipation plate 109a and the third sealing part 107a or the like into account, their thicknesses may be designed to be the same when pressed.

Note that, however, in the structure where the third sealing parts 107a and 107b of the adjacent film-covered batteries 101a face each other as in the example of FIG. 4, their thicknesses are not necessarily substantially the same. To be specific, even if their thicknesses are not substantially the same, the same effects are obtained as long as the total thickness of the third sealing parts 107a and the heat dissipation plate 109b and the total thickness of the third sealing parts 107b and the heat dissipation plate 109a are substantially the same.

Further, in the assembled battery 100a shown in FIG. 4, a heat dissipation plate 109c is placed on the side where the third sealing parts 107a and 107b do not exist. The heat dissipation plate 109c is placed on one face having the maximum area among the exterior faces of the power generation element 104 (the power generation element 104b in this example) and preferably has an area equal to or larger than this maximum area. This enables uniform pressing of the power generation element 104 when the film-covered batteries 101a are used to produce the assembled battery 100a (when it is pressed). Note that the heat dissipation plate 109c is not necessarily placed.

In the assembled battery 100a according to this embodiment, a projection area of the third sealing part 107 and the heat dissipation plate (the heat dissipation plate 109a, or both of the heat dissipation plates 109a and 109b) onto the one face with the maximum area is 40% or more of the area of the one face with the maximum area. This condition is satisfied in the example of FIG. 4.

The projection area indicates an area when projecting a target part onto the above one face. Thus, when the third sealing part 107 and the heat dissipation plate 109 overlap in the assembled battery 100a, the projection area is the sum of the overlapping area and a non-overlapping part. In the example of FIG. 4, as a first definition, the projection area on the power generation element 104a can be defined as a value obtained by adding the area of the heat dissipation plate 109a and the area of the third sealing part 107a together. Alternatively, in the example of FIG. 4, as a second definition, the projection area on the power generation element 104a can be defined as a value obtained by adding the area of the heat dissipation plate 109b and the area of the third sealing part 107a together. Alternatively, in the example of FIG. 4, as a third definition, the projection area on the power generation element 104a can be defined as a value obtained by adding the projection area of the heat dissipation plate 109b and the third sealing part 107a and the area of the heat dissipation plate 109a.

A condition indicating a lower limit, such as 40% or the like mentioned above, and a condition indicating an upper limit are described by using a smaller one of first and second projection areas, and using a third projection area in some cases.

Although FIG. 4 shows an example in which the projection area of the third sealing part 107a and the heat dissipation plates 109a and 109b occupies 80% or more of the area of the above-mentioned one face, it may exceed 100% as long as a part projecting from the one face is the heat dissipation plate.

In this structure, the assembled battery 100a according to this embodiment is fixed in the state where 80% or more of one face with the maximum area of the power generation element 104 is pressed. Specifically, in this embodiment, the area of a pressed region, which is composed of the two third sealing parts 107a and 107b and the two heat dissipation plates 109a and 109b at the boundary between the adjacent film-covered batteries 101a, occupies 80% or more of the face with the maximum area of the power generation element 104a. Further, the area of this pressed region occupies 80% or more of the face with the maximum area of the power generation element 104b. The pressed region is a region that can be pressed when the batteries are stacked.

Note that FIG. 4 shows the film-covered batteries 101a at both ends (four from the top and two from the bottom in FIG. 4) among the film-covered batteries 101a stacked in layers, and does not show the other film-covered batteries 101a. Six or less film-covered batteries 101a can be stacked in layers. This is the same in each drawing according to other embodiments described later. Further, in each drawing of the assembled battery in FIG. 4 and according to other embodiments described later, there is a space between parts for easier understanding of a cross-sectional shape. In an actual assembled battery, however, the film-covered batteries and the heat dissipation plates, which are described later, are stacked in layers, pressed from both sides and fixed in the production process. Therefore, in the actual assembled battery, a gap in the stacking direction (vertical direction in the figure) is filled in each drawing. Further, the assembled battery according to this embodiment and other embodiments is not necessarily placed in the direction shown in the figure, and it may be placed laterally with the top and bottom of FIG. 4 placed on the same horizontal plane, for example.

Further, although an example in which the projection area of the third sealing part 107a and the heat dissipation plate 109 occupies 80% or more of the face having the maximum area among the exterior faces of the power generation element 104a is described above, the projection area may be at least 40% of that face as described above. For example, the projection area of the third sealing part 107a and the heat dissipation plate 109b which occupies 40% to 50% is enough as long as the adjacent film-covered batteries 101a are placed in such a way that the third sealing parts 107a and 107b face each other and the projection positions of them in the stacking direction do not overlap. This is to allow the pressed region to be complemented by adding the area of the adjacent sealing part 107b. This is described as an example of fourth and fifth embodiments described later. Further, the projection area of the third sealing part 107a and the heat dissipation plate 109b preferably has an area that occupies 45% or more of the maximum area among the exterior faces of the power generation element 104a, and more preferably has an area that occupies 47% or more. The projection area of the third sealing part 107b and the heat dissipation plate 109b preferably has an area that occupies 45% or more of the maximum area among the exterior faces of the power generation element 104b, and more preferably has an area that occupies 47% or more.

Although the area ratio regarding the projection area of the third sealing part 107 and the heat dissipation plate 109 is specified above, the area ratio regarding the third sealing part 107 only may be specified because the heat dissipation plate 109 can overlap the third sealing part 107.

To be specific, a sealing area of the third sealing part 107 preferably has an area that occupies 40% or more of one face having the maximum area among the exterior faces of the power generation element 104, and more preferably has an area that occupies 45% or more, and further preferably has an area that occupies 47% or more. Thus, in this embodiment, the area of the sealing area composed of the two third sealing parts 107a and 107b at the boundary between the adjacent film-covered batteries 101a is 80% or more of the one face with the maximum area of the power generation element 104. This area is preferably 90% or more, and more preferably 94% or more. Further, the third sealing part 107 has an area that occupies 50% or less of the maximum area. Thus, the area of the sealing area composed of the two third sealing parts 107a and 107b is 100% or less of the maximum area.

With such conditions in this example, the adjacent film-covered batteries 101a in the assembled battery 100a can be placed in such a way that the third sealing parts 107a and 107b face each other and the projection positions of them in the stacking direction do not overlap. This allows a uniform pressure to be applied to the power generation element 104, for example, and by making the heat dissipation plate 109 thinner than the third sealing part 107, the density of the power generation element 104 in the stacking direction increases, which improves the volumetric efficiency of the assembled battery 100a.

As described above, even when the area ratio is specified with the third sealing part 107, by placing a part or the whole of the heat dissipation plate 109 to overlap the third sealing part 107, it is possible to satisfy the above-described conditions specified with the projection area of the heat dissipation plate 109 and the third sealing part 107. For example, the projection area of the third sealing part 107 and the heat dissipation plate 109 may be set to 40% or more of the area of the one face with the maximum area, and the sealing area of the third sealing part 107 may be set to 10% to 50% of the area of the one face.

Note that, however, the area and the thickness of the heat dissipation plate 109 may be determined based on an object on which the assembled battery 100a is to be mounted, required standards and the like. Further, the area ratio of the third sealing part 107 and the heat dissipation plate 109 in a set of one film-covered battery 101a and the heat dissipation plate 109 is not particularly limited.

A material of the heat dissipation plate 109 is described hereinafter. The same applies to the heat dissipation plate 109c.

The heat dissipation plate 109 is a plate-like member capable of dissipating heat. The heat dissipation plate 109 is regarded as having heat dissipation capability if it is made of a material having at least some thermal conductivity. The heat dissipation plate 109 is preferably made of metal in terms of thermal conductivity (heat dissipation). Metal may be aluminum, iron, copper or the like, for example, though not limited thereto.

On the other hand, when taking safety into consideration to the maximum extent, it is preferred to assume the possibility of a short-circuit between a positive terminal and a negative terminal of the adjacent film-covered batteries 101a. The short-circuit can occur when the film covering material 108 that is used as a coverage case has metal such as aluminum in its inner layer and the inner-layer metal is not covered. The inner-layer metal can become uncovered as a result that the center or the edge of an outer layer (insulating layer) of the film covering material 108 is broken for reasons such as impact on the entire assembled battery.

In this point of view, the heat dissipation plate 109 preferably has no electrical conductivity (has insulating properties). The heat dissipation plate 109 may have insulating properties when it is made of plastic, for example. A material for imparting insulating properties to the heat dissipation plate 109, however, is not limited to plastic. With the insulating heat dissipation plate 109, the assembled battery 100a, ensures insulating properties in each of the film-covered batteries 101a, which are composing elements of the assembled battery 100a, and even when a defect occurs in one film-covered battery 101a, the defect is confined within the single battery.

Whether to put priority on heat dissipation or safety, i.e., whether to make the heat dissipation plate 109 using metal (with electrical conductivity) or insulating material, may be determined based on an object on which the assembled battery 100a is to be mounted, required standards and the like.

Further, in order to improve heat dissipation, the heat dissipation plate 109 preferably has a plurality of though-holes arranged in parallel on the one face with the maximum area. Particularly, it is preferable in terms of heat dissipation that both ends of the though-holes are not covered by another member when the assembled battery is formed. Each through-hole is preferably linear, like a through-hole of a cardboard box, though not limited thereto. Further, heat dissipation can be improved with use of grooves made by embossing the heat dissipation plate or the like, not limited to using the though-holes.

As described above, the assembled battery according to this embodiment has a structure in which the heat dissipation plate is placed between the adjacent film-covered batteries, and the film-covered batteries are fixed in optimum conditions by the third sealing part and the heat dissipation plate. Particularly, when the film-covered batteries are stacked in layers to form the assembled battery, heat is trapped inside the assembled battery; however, the heat dissipation of the assembled battery can be enhanced by placing the heat dissipation plate between the adjacent film-covered batteries.

Thus, in the assembled battery according to this embodiment, it is possible to achieve good heat dissipation and high energy density with improved volumetric efficiency while fixing the film-covered batteries in a right way. This embodiment thereby provides the assembled battery with long life and high safety. When such an assembled battery is mounted on a mobile object such as an automobile, for example, it is tolerant to vibration of the mobile object. Although FIG. 4 shows an example where the film-covered batteries 101a shown in FIGS. 1 and 3 are stacked, the same effects are obtained also when the film-covered batteries 101a shown in FIGS. 1 and 2 are stacked.

Second Embodiment

Figure 5:
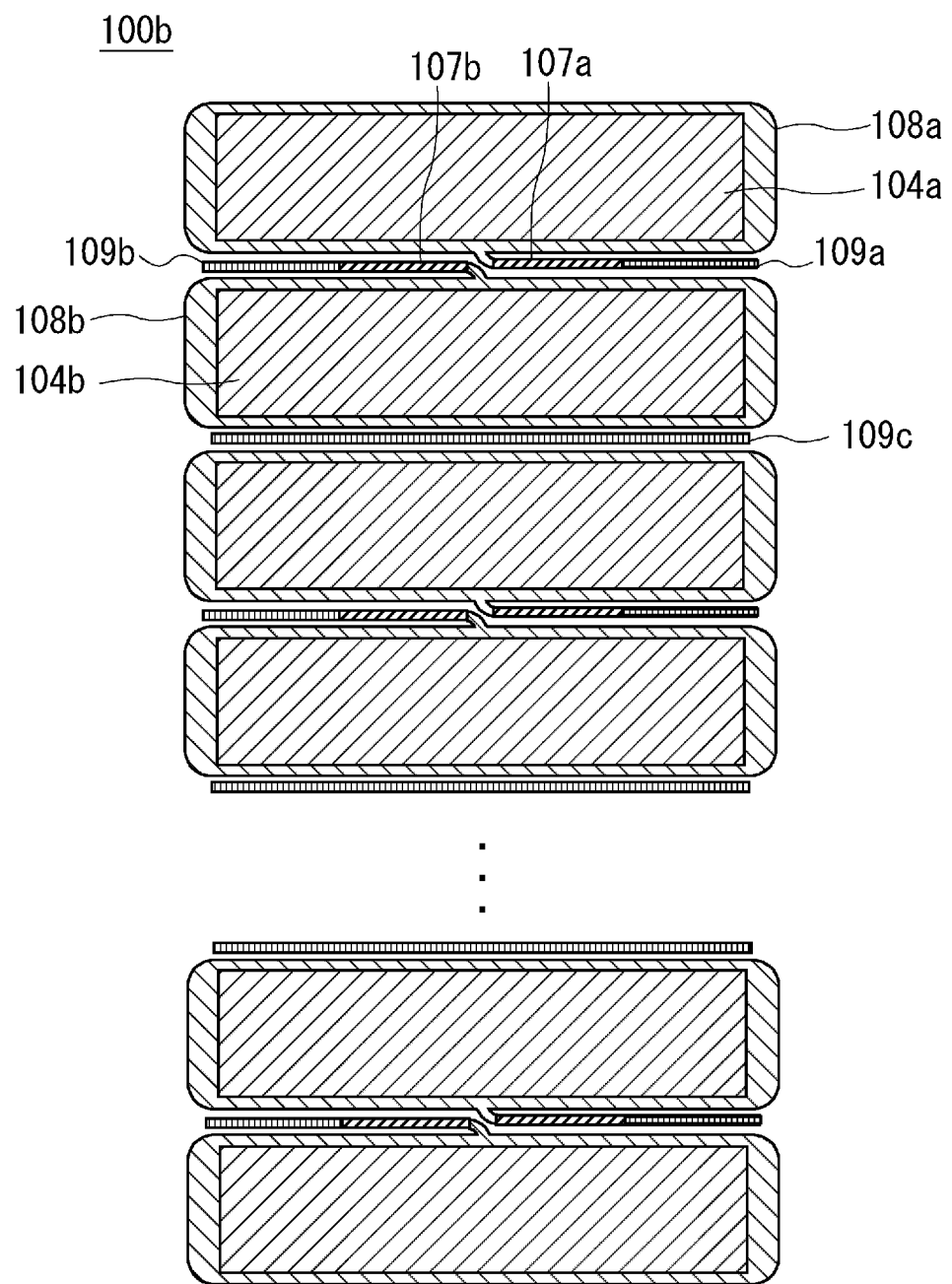
FIG. 5 is a cross-sectional view showing an example structure of an assembled battery according to a second embodiment.

FIG. 5 is a cross-sectional view showing an example structure of an assembled battery according to a second embodiment. As shown in FIG. 5, in an assembled battery 100b according to this embodiment, the widths of the third sealing parts 107a and 107b and the heat dissipation plates 109a and 109b are shorter compared with the assembled battery 100a according to the first embodiment. The assembled battery 100b is different from the assembled battery 100a shown in FIG. 4 in this point. The other points in the assembled battery 100b according to this embodiment are the same as the assembled battery according to the first embodiment except for the position of the heat dissipation plate, and the description thereof is partly omitted; however, various examples described in the first embodiment are applicable as appropriate. For example, the film-covered battery 101a having the structure where the second sealing part 106 including the third sealing part 107 is formed by bonding the reverse side of the film covering material 108 to the front side, just like the example structure shown in FIG. 2, may be applied in this embodiment.

In the assembled battery 100b, just like the assembled battery 100a, a plurality of film-covered batteries 101a are stacked in layers in such a way that the third sealing parts 107a and 107b do not overlap in the stacking direction and the surfaces having the third sealing parts 107a and 107b face each other. In the assembled battery 100b, however, the third sealing parts 107a and 107b are stacked in the same plane.

The heat dissipation plate 109a is placed on one face having the maximum area among the exterior faces of the power generation element 104a, which is the face where the third sealing part 107a is formed. Likewise, the heat dissipation plate 109b is placed on one face having the maximum area among the exterior faces of the power generation element 104b, which is the face where the third sealing part 107b is formed. Further, in the assembled battery 100b, the heat dissipation plates 109a and 109b are also placed in the same plane as the third sealing parts 107a and 107b. The heat dissipation plate 109a is placed in the same plane as the third sealing part 107a at the front edge of the third sealing part 107a, and the heat dissipation plate 109b is placed in the same plane as the third sealing part 107b at the front edge of the third sealing part 107b.

Note that, in FIG. 5, both of the heat dissipation plates 109a and 109b are placed on one face having the maximum area among the exterior faces of the power generation element 104a, which is the face where the third sealing part 107a is formed. Likewise, both of the heat dissipation plates 109a and 109b are placed on one face having the maximum area among the exterior faces of the power generation element 104b, which is the face where the third sealing part 107b is formed.

In this embodiment also, the heat dissipation plate 109a, which is a part of the heat dissipation plate, is placed not to overlap the third sealing part 107a of one film-covered battery between the adjacent film-covered batteries. Likewise, the heat dissipation plate 109b, which is another part of the heat dissipation plate, is placed not to overlap the third sealing part 107b of the other film-covered battery between the adjacent film-covered batteries.

Further, as shown in FIG. 5, it is preferable that the thickness of the heat dissipation plate 109a and the thickness of the third sealing part 107a are substantially the same and the thickness of the heat dissipation plate 109b and the thickness of the third sealing part 107b are substantially the same. This is with a view to achieve a uniform thickness of one film-covered battery 101a together with the heat dissipation plate 109a, which allows pressure to be evenly applied when pressing the film-covered battery 101a and the adjacent film-covered battery 101a stacked together. Note that, by taking a difference in elasticity between the heat dissipation plate 109a and the third sealing part 107a or the like into account, their thicknesses may be designed to be the same when pressed.

Although the heat dissipation plate 109c is placed on the side where the third sealing parts 107a and 107b do not exist in the assembled battery 100b shown in FIG. 5, just like the assembled battery 100a, the heat dissipation plate 109c is not necessarily placed.

In the assembled battery 100b according to this embodiment, there is no region where the third sealing parts 107a and 107b and the heat dissipation plates 109a and 109b overlap in the stacking direction, which is different from the assembled battery 100a. In the assembled battery 100b according to this embodiment, however, just like the assembled battery 100a, the projection area of the third sealing part 107 and the heat dissipation plate (the heat dissipation plate 109a, or both of the heat dissipation plates 109a and 109b) is 40% or more of the area of the one face with the maximum area.

As an example, FIG. 5 shows an example in which the projection area of the third sealing part 107a and the heat dissipation plate 109a, 109b is 40% or more and 75% or less of the area of the one surface.

This example corresponds to an example in which, in a set of one film-covered battery and the heat dissipation plate 109a, the projection area of the third sealing part 107a and the heat dissipation plate 109a is 40% or more and 50% or less of the area of the one surface. In this example, in another set also, the projection area of the third sealing part 107b and the heat dissipation plate 109b is 40% or more and 50% or less of the area of the one surface. The projection area of the third sealing part 107a and the heat dissipation plate 109a preferably has an area that occupies 45% or more and 50% or less of the maximum area among the exterior faces of the power generation element 104a, and more preferably has an area that occupies 47% or more and 50% or less. The projection area of the third sealing part 107b and the heat dissipation plate 109b preferably has an area that occupies 45% or more and 50% or less of the maximum area among the exterior faces of the power generation element 104b, and more preferably has an area that occupies 47% or more and 50% or less.

In this structure, the assembled battery 100b according to this embodiment is fixed in the state where 80% or more (100% or more in the above-described example) of one face with the maximum area of the power generation element 104 is pressed. Specifically, in this embodiment, the area of a pressed region, which is composed of the two third sealing parts 107a and 107b and the two heat dissipation plates 109a and 109b at the boundary between the adjacent film-covered batteries 101a, is 80% or more of the face with the maximum area of the power generation element 104a. Further, the area of this pressed region is 80% or more of the face with the maximum area of the power generation element 104b.

In this embodiment also, the sealing area of the third sealing part 107 may be designed to occupy 40% or more of one face having the maximum area among the exterior faces of the power generation element 104. Likewise, in this embodiment also, the sealing area of the third sealing part 107 may be designed to occupy 45% or more of the one face and further designed to occupy 47% or more of the one face. In this embodiment, because the heat dissipation plate 109 does not overlap the third sealing part 107, the area of the heat dissipation plate 109 is reduced as the area of the sealing area of the third sealing part 107 increases. It is desirable that designing takes into account that heat dissipation is higher as the area of the heat dissipation plate 109 is larger.

As described above, the assembled battery 100b does not have a region where the third sealing parts 107a and 107b and the heat dissipation plates 109a and 109b overlap in the stacking direction, which is different from the assembled battery 100a. The assembled battery 100b can also achieve uniform application of pressure to the power generation element 104. In the assembled battery according to this embodiment, the density of the power generation element in the stacking direction is higher than that in the assembled battery according to the first embodiment, and it is thereby possible to further improve the volumetric efficiency in addition to achieving the effects of the first embodiment.

Third Embodiment

Figure 6:
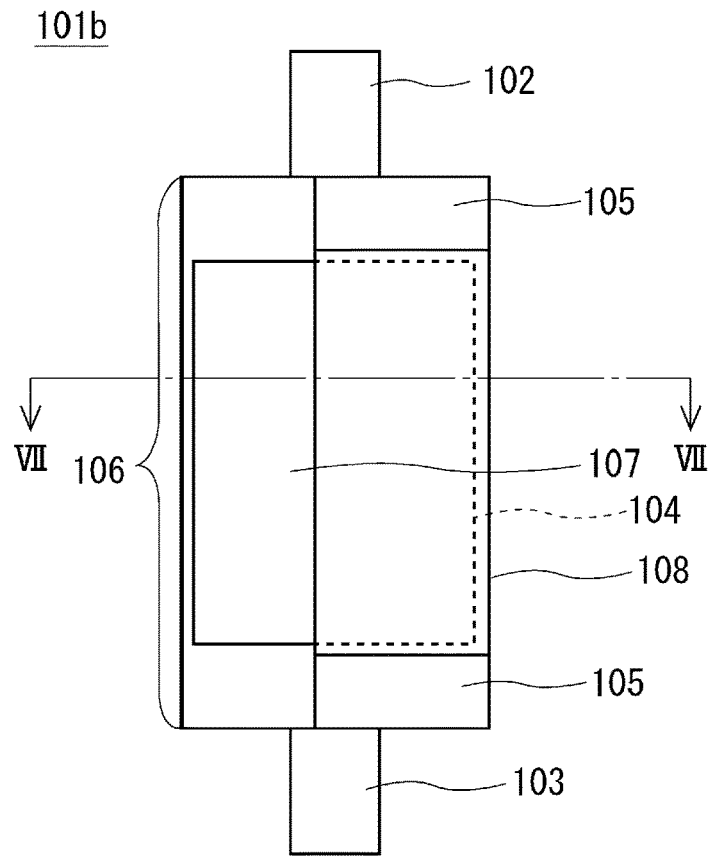
FIG. 6 is a plan view showing an example structure of a film-covered battery included in an assembled battery according to a third embodiment.

Prior to describing an assembled battery according to a third embodiment, a film-covered battery included in this assembled battery is described hereinafter with reference to FIGS. 6 and 7. FIG. 6 is a plan view showing an example structure of the film-covered battery included in the assembled battery according to the third embodiment, and FIG. 7 is a cross-sectional view along line VII-VII in FIG. 6.

Figure 7:
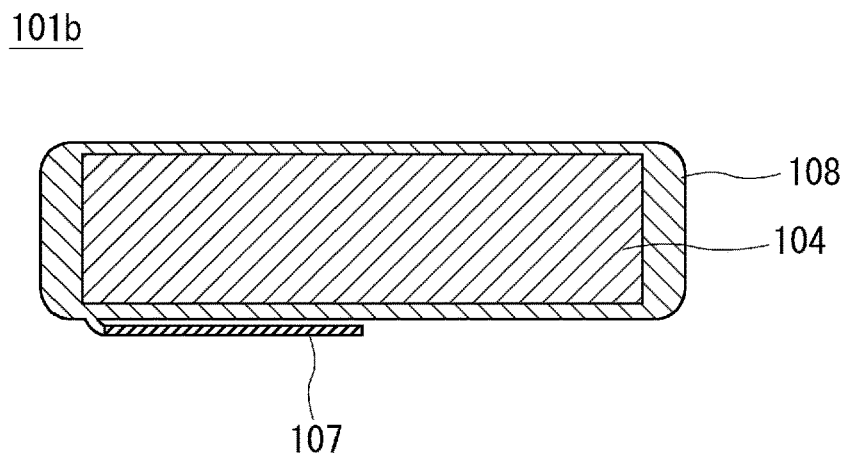
FIG. 7 is a cross-sectional view along line VII-VII showing an example structure of the film-covered battery shown in FIG. 6.

As shown in FIGS. 6 and 7, in a film-covered battery 101*b* included in the assembled battery according to this embodiment, sealing in the second sealing part 106 in the same plane as the film covering material 108 begins at the edge of the power generation element 104. The film-covered battery 101*b* is different from the film-covered battery 101*a* shown in FIGS. 1 and 3 in this point. The other points in the film-covered battery 101*b* according to this embodiment and their effects are the same as those in the film-covered battery 101*a* according to the first embodiment. For example, in this embodiment, a structure where the reverse side and the front side of the film covering material 108 are bonded together, like the example structure shown in FIG. 2, may be used.

Figure 8:
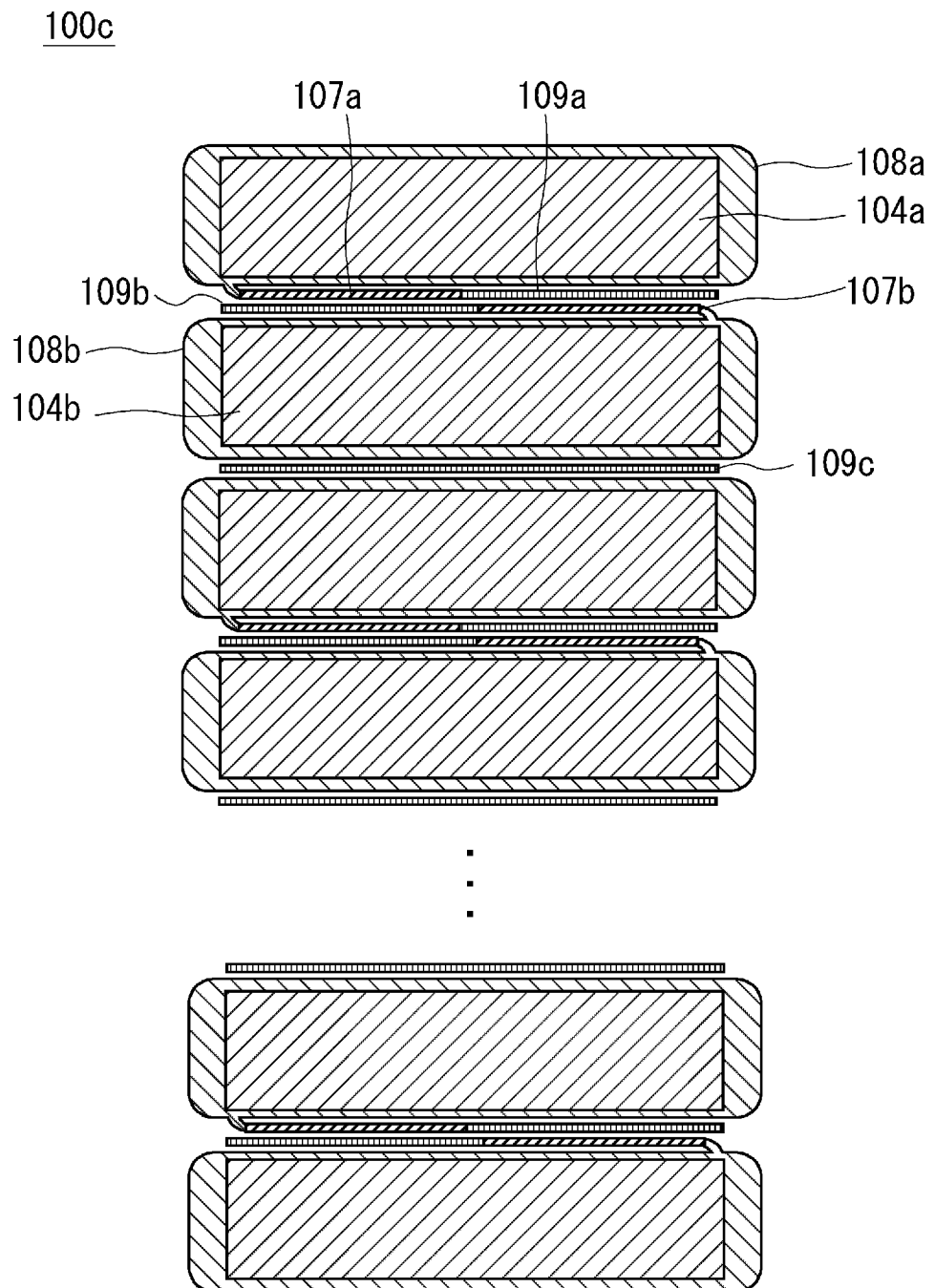
FIG. 8 is a cross-sectional view showing an example structure of the assembled battery according to the third embodiment.

The assembled battery according to this embodiment is described hereinafter with reference also to FIG. 8. FIG. 8 is a cross-sectional view showing an example structure of the assembled battery according to the third embodiment, and it is a cross-sectional view showing an example structure of the assembled battery in which a plurality of film-covered batteries 101*b* in FIGS. 6 and 7 are stacked together.

As shown in FIG. 8, in an assembled battery 100*c* according to this embodiment, the film-covered batteries 101*b* are stacked instead of the film-covered batteries 101*a* in the first embodiment, and the heat dissipation plate 109 is placed accordingly. The other points in the assembled battery 100*c* according to this embodiment are the same as the assembled battery according to the first embodiment, and the description thereof is partly omitted; however, various examples described in the first embodiment are applicable as appropriate.

In the assembled battery 100*c* according to this embodiment, a plurality of film-covered batteries 101*b* are stacked in layers in such a way that the third sealing parts 107*a* and 107*b* do not overlap in the stacking direction and the surfaces having the third sealing parts 107*a* and 107*b* face each other. In this point, the assembled battery 100*c* is the same as the assembled battery 100*a* according to the first embodiment.

In the assembled battery 100*c* according to this embodiment, the film-covered batteries 101*b* flipped vertically are alternately stacked so that the third sealing parts 107*a* and 107*b* face each other, and they are connected in series, just like the way the film-covered batteries 101*a* are stacked in the first embodiment. In this embodiment also, the film-covered batteries 101*b* may be connected in parallel, just like in the first embodiment.

In the assembled battery 100*c* according to this embodiment also, the heat dissipation plates 109*a* and 109*b* are placed between the adjacent film-covered batteries 101*b* as shown in FIG. 8. In the assembled battery 100*c*, the heat dissipation plate 109*a* is placed in the same plane as the third sealing part 107*a* at the front edge of the third sealing part 107*a*, and the heat dissipation plate 109*b* is placed in the same plane as the third sealing part 107*b* at the front edge of the third sealing part 107*b*. Further, although the heat dissipation plate 109*c* is placed on the side where the third sealing parts 107*a* and 107*b* do not exist in the assembled battery 100*c* also, just like the assembled battery 100*a*, the heat dissipation plate 109*c* is not necessarily placed.

Further, the assembled battery 100*c* according to this embodiment is fixed in the state where 80% or more of one face with the maximum area of the power generation element 104 is pressed, just like in the first embodiment. In addition, the area ratio between the projection area of the third sealing part 107*a* and the heat dissipation plates 109*a* and 109*b* and the area of a face having the maximum area among the exterior faces of the power generation element 104*a* or the like is the same as that described in the first embodiment. Further, in this embodiment also, the third sealing part 107 can be preferably designed to have the area that occupies 40% or more of the maximum area among the exterior faces of the power generation element 104, and the area ratio related to the third sealing part 107 is the same as that described in the first embodiment.

As described above, the assembled battery according to this embodiment has the same effects as the assembled battery according to the first embodiment. Further, in the assembled battery according to this embodiment, a position at which the same sides of the film covering material 108 are bonded together is at the edge of the film-covered battery 101*b*, and it is thereby possible to uniformly apply a force to the principal parts of the power generation element 104.

Fourth Embodiment

Figure 9:
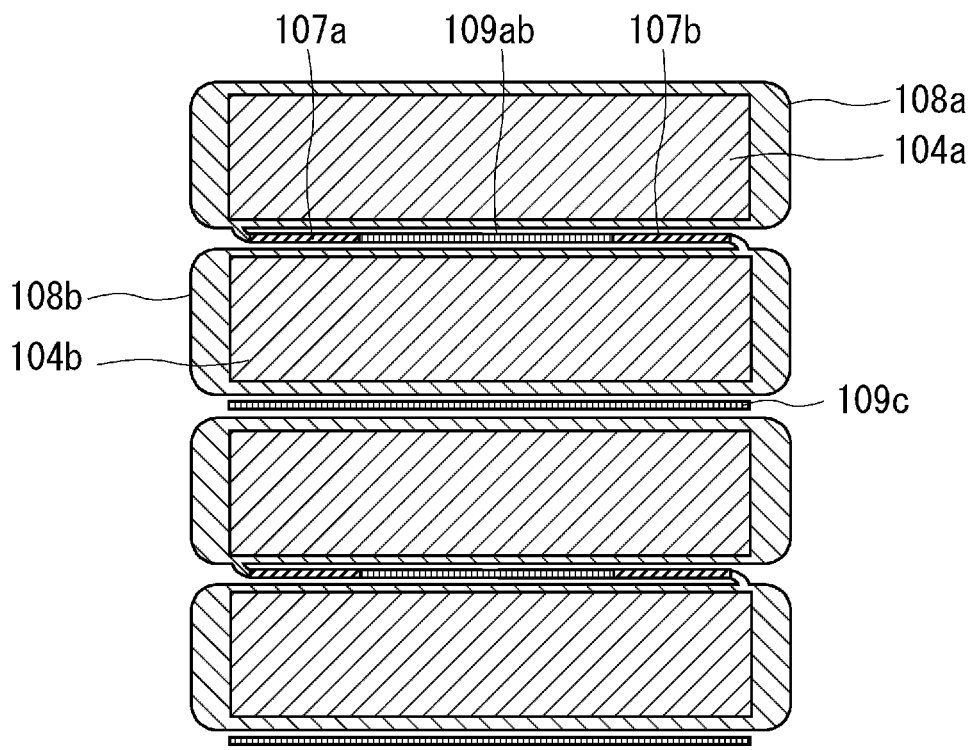
FIG. 9 is a cross-sectional view showing an example structure of an assembled battery according to a fourth embodiment.

FIG. 9 is a cross-sectional view showing an example structure of an assembled battery according to a fourth embodiment. As shown in FIG. 9, in an assembled battery 100*d* according to this embodiment, the widths of the third sealing parts 107*a* and 107*b* are shorter compared with the assembled battery 100*c* according to the third embodiment, and one heat dissipation plate 109*ab* is placed instead of the heat dissipation plates 109*a* and 109*b*. The assembled battery 100*d* is different from the assembled battery 100*c* shown in FIG. 8 in this point. The other points in the assembled battery 100*d* according to this embodiment are the same as the assembled battery according to the third embodiment, and the description thereof is partly omitted; however, various examples described in the third embodiment are applicable as appropriate.

In the assembled battery 100*d*, just like the assembled battery 100*c*, a plurality of film-covered batteries 101*a* are stacked in layers in such a way that the third sealing parts 107*a* and 107*b* do not overlap in the stacking direction and the surfaces having the third sealing parts 107*a* and 107*b* face each other. In the assembled battery 100*d*, however, the third sealing parts 107*a* and 107*b* and the heat dissipation plate 109*ab* are placed in the same plane.

The heat dissipation plate 109*ab* is placed between the front edge of the third sealing part 107*a* and the front edge of the third sealing part 107*b*. The area of the heat dissipation plate 109*ab* may be 50% or more and 80% or less of the area of a face having the maximum area among the exterior faces of the power generation element 104, for example. In this case, each of the third sealing parts 107*a* and 107*b* may occupy 10% or more and 25% or less of the area having the maximum area among the exterior faces of the power generation element 104, for example.

Further, by such placement of the third sealing parts 107*a* and 107*b* and the heat dissipation plate 109*ab*, the assembled battery 100*d* according to this embodiment is fixed in the state where 80% or more (in FIG. 9, slightly less than 100%) of one face with the maximum area of the power generation element 104 is pressed. Further, to achieve uniform application of pressure in this placement, the thickness of the heat dissipation plate 109*ab* and the thickness of the third sealing parts 107*a* and 107*b* are substantially the same in this embodiment also. Although the heat dissipation plate 109*c* is placed on the side where the third sealing parts 107a and 107b do not exist in the assembled battery 100d also, the heat dissipation plate 109c is not necessarily placed.

As described above, the assembled battery 100d does not have a region where the third sealing parts 107a and 107b and the heat dissipation plate 109ab overlap in the stacking direction, which is different from the assembled battery 100c. Further, as described above, the assembled battery 100d can also achieve uniform application of pressure to the power generation element 104. In the assembled battery according to this embodiment, the density of the power generation element in the stacking direction is higher than that in the assembled battery according to the third embodiment, and it is thereby possible to further improve the volumetric efficiency as well as reducing the number of heat dissipation plates, in addition to obtaining the effects described in the third embodiment.

Further, according to this embodiment, it is possible to use the heat dissipation plate in a simple structure, in addition to the effects in the second embodiment. For example, the same heat dissipation effect as in the second embodiment can be obtained only by placing one heat dissipation plate 109ab between each pair of adjacent film-covered batteries 101b, which reduces the number of parts and man-hours during production.

Fifth Embodiment

Figure 10:
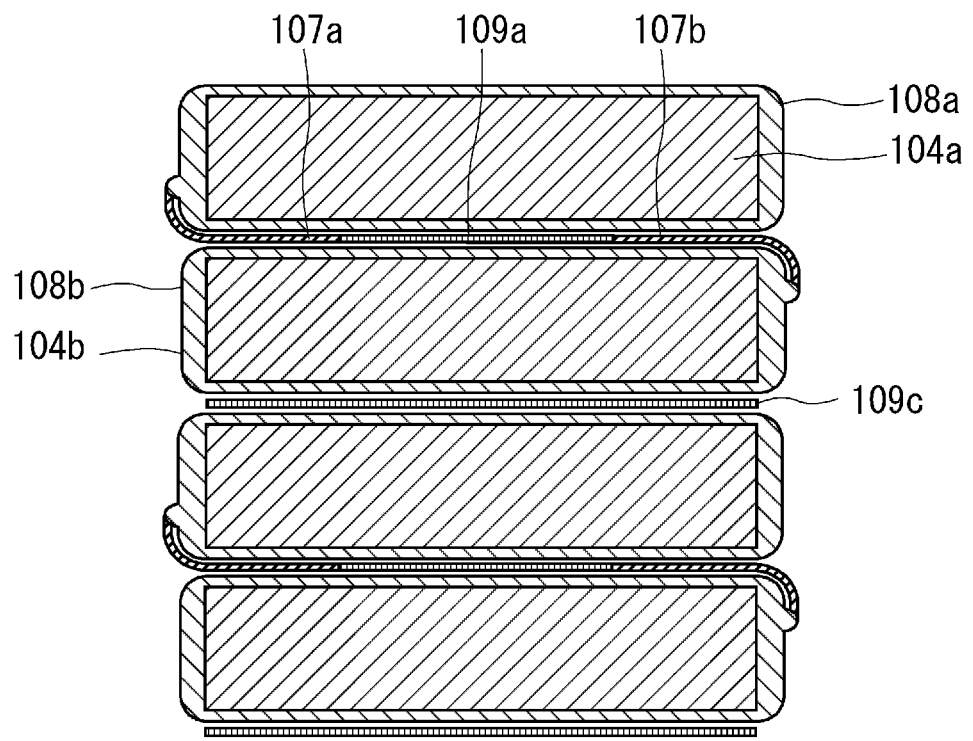
FIG. 10 is a cross-sectional view showing an example structure of an assembled battery according to a fifth embodiment.

FIG. 10 is a cross-sectional view showing an example structure of an assembled battery according to a fifth embodiment. As shown in FIG. 10, in an assembled battery 100e according to this embodiment, the film-covered battery 101b shown in FIGS. 6 and 7 is modified as follows in the assembled battery 100d according to the fourth embodiment.

Specifically, a plan view of the film-covered battery 101b according to this embodiment is as shown in FIG. 6, and a cross-sectional view thereof is as shown in FIG. 10. To be more specific, in the film-covered battery 101b according to this embodiment, the second sealing part 106 begins at the lateral face of the power generation element 104 (one of the faces not having the maximum area) and is placed along the power generation element 104. Further, in the film-covered battery 101b according to this embodiment, the same sides of the film covering material 108 are bonded together in this lateral face and one face with the maximum area of the power generation element 104.

The other points and the effects in the assembled battery 100e according to this embodiment are the same as those of the fourth embodiment, and the description thereof is omitted. This embodiment has the effect that, when the film-covered battery 101b is stacked, a beginning point of bonding does not interfere with the stacking, thereby achieving higher density.

Sixth Embodiment

Figure 11:
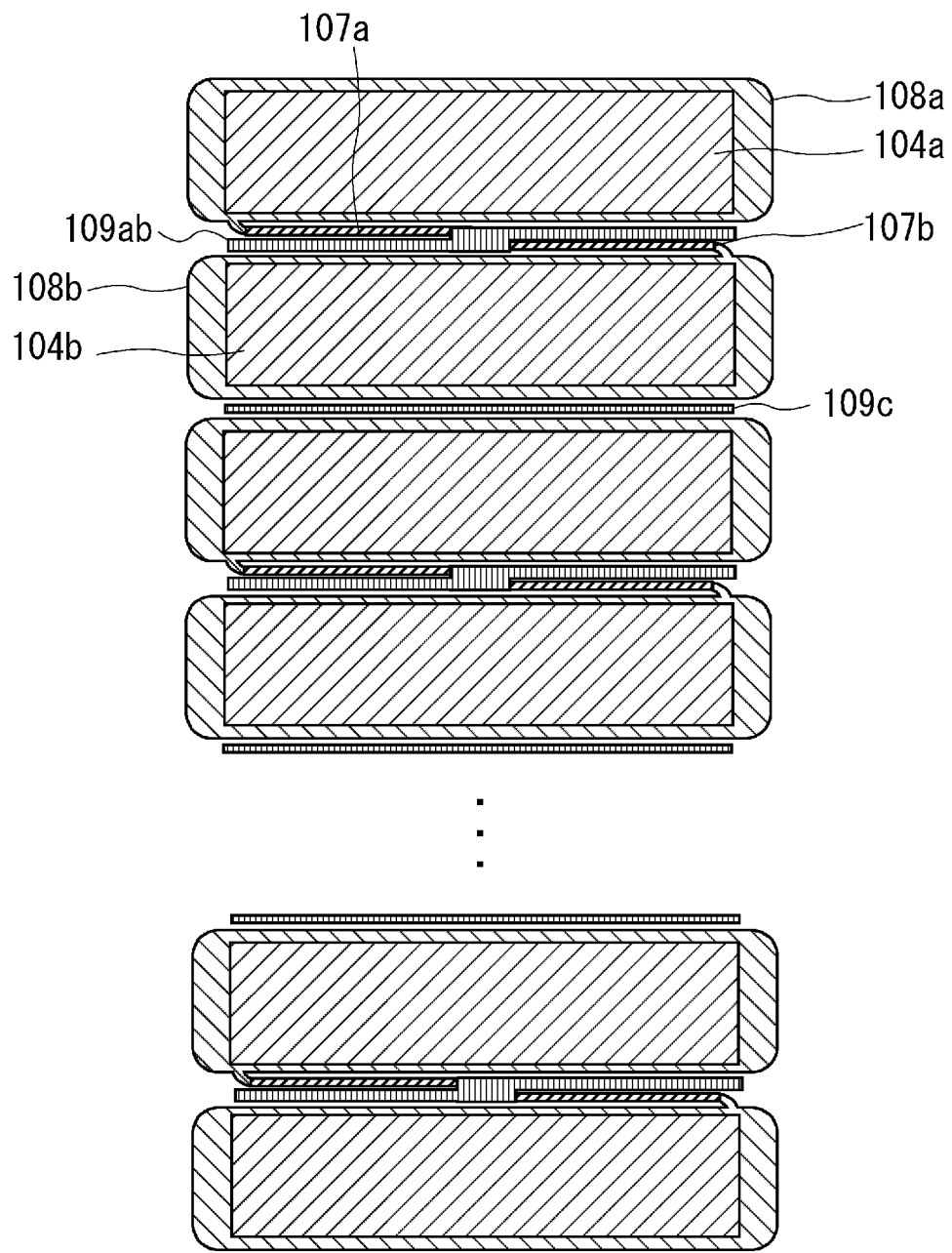
FIG. 11 is a cross-sectional view showing an example structure of an assembled battery according to a sixth embodiment.

FIG. 11 is a cross-sectional view showing an example structure of an assembled battery according to a sixth embodiment. As shown in FIG. 11, an assembled battery 100f according to this embodiment is different from the assembled battery 100c according to the third embodiment in FIG. 8 in using a heat dissipation plate 109ab that combines the heat dissipation plates 109a and 109b.

In the assembled battery 100f according to this embodiment, a part of the heat dissipation plate 109ab is placed to overlap the whole of the third sealing part 107a of one film-covered battery between the adjacent film-covered batteries. Further, in the assembled battery 100f, another part of the heat dissipation plate 109ab is placed not to overlap the third sealing part 107a. Likewise, in this assembled battery 100f, a part of the heat dissipation plate 109ab is placed to overlap the whole of the third sealing part 107b of the other film-covered battery, and another part of the heat dissipation plate 109ab is placed not to overlap the third sealing part 107b.

The heat dissipation plate 109ab is designed so that the total thickness of the heat dissipation plate 109ab and the third sealing part 107a is substantially the same as the total thickness of the heat dissipation plate 109ab and the third sealing part 107b. This enables application of a uniform force to the power generation element 104 during pressing.

The other points and the effects in the assembled battery 100f according to this embodiment are the same as those of the third embodiment, and the description thereof is omitted. This embodiment also has the effect that the number of parts and man-hours during production of the heat dissipation plate are smaller than those in the third embodiment.

Although the film-covered batteries 101b as shown in FIGS. 6 and 7 are stacked to form the assembled battery 100f in FIG. 11, the film-covered batteries as shown in FIG. 10 may be stacked instead.

Seventh Embodiment

Figure 12:
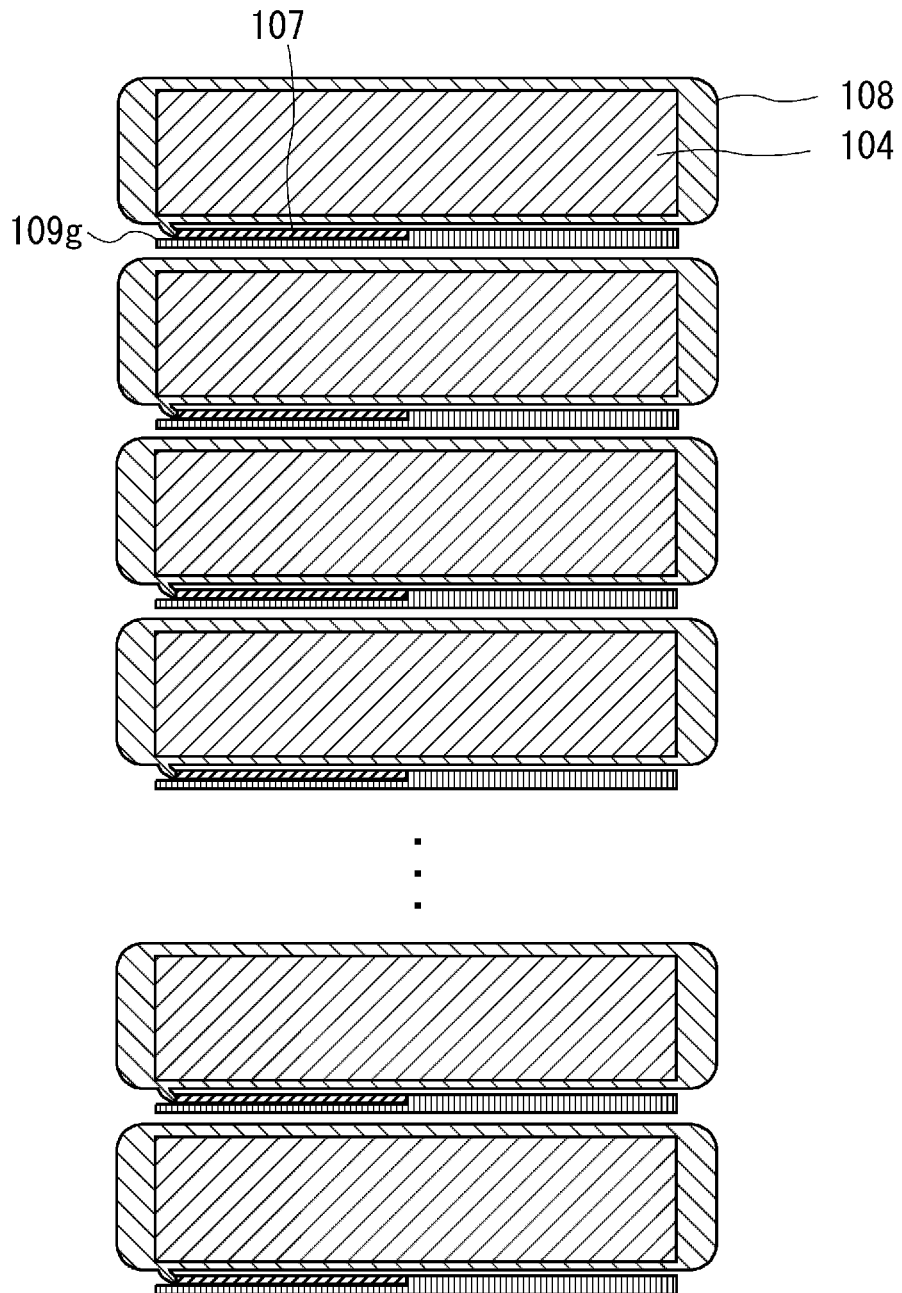
FIG. 12 is a cross-sectional view showing an example structure of an assembled battery according to a seventh embodiment.

FIG. 12 is a cross-sectional view showing an example structure of an assembled battery according to a seventh embodiment. Although an example in which adjacent film-covered batteries are stacked (placed) in either one of the facing state or the non-facing state is described in the first to sixth embodiments, all of adjacent film-covered batteries are stacked in a non-facing state in this embodiment. Thus, as shown in FIG. 12, an assembled battery 100g according to this embodiment is produced by stacking the adjacent film-covered batteries 101b in the non-facing state.

To be specific, in the assembled battery 100g, the film-covered batteries 101b shown in FIGS. 6 and 7 are placed with the third sealing part 107 facing the same direction in the stacking direction, and they are connected in series. They may be connected in parallel in this embodiment also. When connecting them directly, the film-covered batteries 101b where the first terminal 102 is a positive terminal and the second terminal 103 is a negative terminal and the film-covered battery 101b where the first terminal 102 is a negative terminal and the second terminal 103 is a positive terminal are produced. Then, those film-covered batteries are alternately rotated in the horizontal direction of FIG. 12 (the width direction of the power generation element 104), and stacked alternately with the third sealing part 107 facing the same direction.

Further, in the assembled battery 100g, a heat dissipation plate 109g is placed between the adjacent film-covered batteries 101b. The heat dissipation plate 109g has a part overlapping the third sealing part 107 and a part not overlapping the third sealing part 107 and is designed in such a way that the total thickness of each part and the third sealing part 107 is substantially the same.

In this manner, in the assembled battery 100g according to this embodiment, the total thickness of the heat dissipation plate 109g and the third sealing part 107 in the overlapping part is substantially the same as the thickness of the heat dissipation plate 109g in the non-overlapping part.

Further, in the assembled battery 100g, an example in which the projection area of the third sealing part 107 and the heat dissipation plate 109g is approximately 100% of the area of one face having the maximum area among the exterior faces of the power generation element 104 is described. Thus, the assembled battery 100g is fixed in the state where approximately 100%, which is 80% or more of the one face, is pressed by the third sealing part 107 and the heat dissipation plate 109g. Note that, in this embodiment also, the sealing area of the third sealing part 107 may be set to 40% or more and to 50% or less of the area of the one face, for example.

The other points and the effects in the assembled battery 100g according to this embodiment are the same as those of the sixth embodiment, for example, and the description thereof is omitted. For example, while the density of the power generation element in the stacking direction is lower and the volumetric efficiency is degraded compared with the sixth embodiment, a process of stacking is easier. Note that, although the film-covered batteries 101b as shown in FIGS. 6 and 7 are stacked to form the assembled battery 100g in FIG. 12, the film-covered batteries as shown in FIG. 10 may be stacked instead.

Eighth Embodiment

Figure 13:
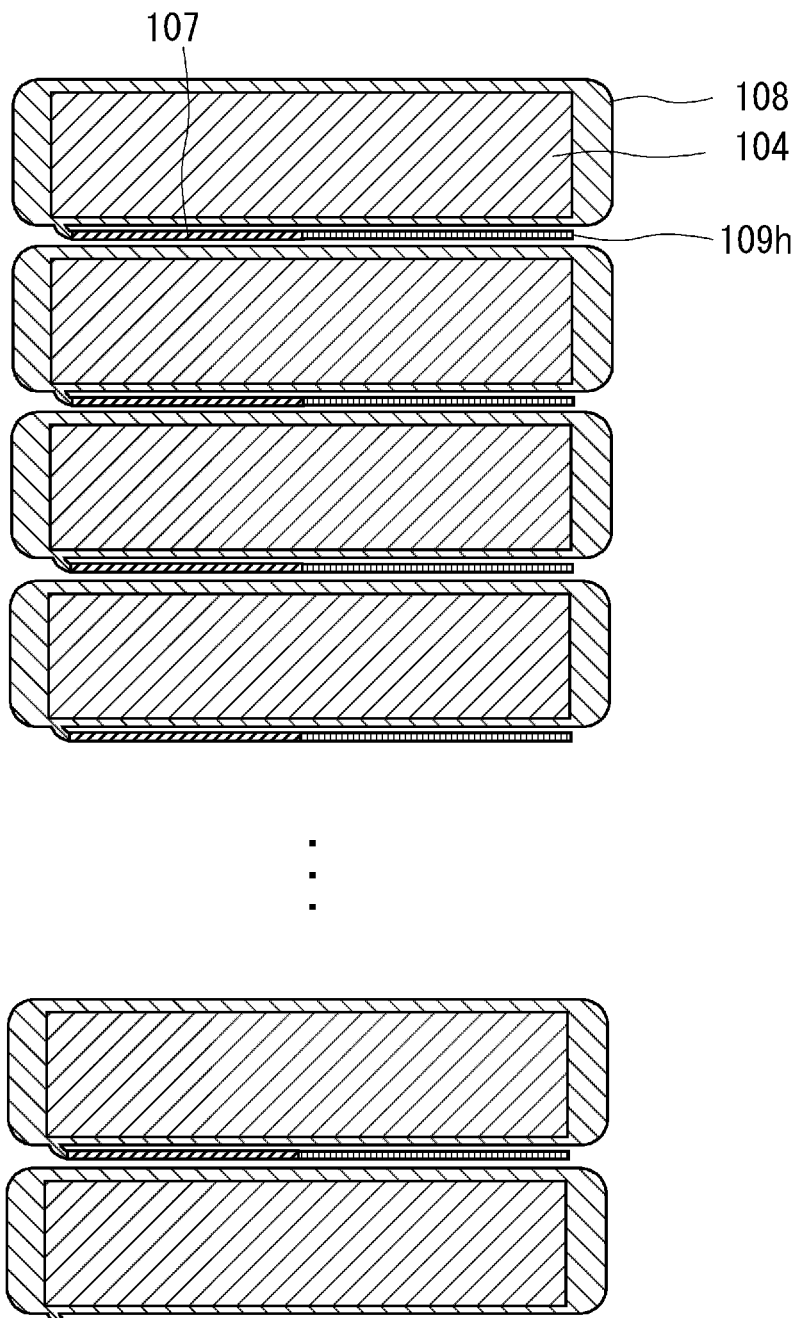
FIG. 13 is a cross-sectional view showing an example structure of an assembled battery according to an eighth embodiment.

FIG. 13 is a cross-sectional view showing an example structure of an assembled battery according to an eighth embodiment. As shown in FIG. 13, an assembled battery 100h according to this embodiment is different from the assembled battery 100g according to the seventh embodiment in that the heat dissipation plate 109g is replaced by a heat dissipation plate 109h. The heat dissipation plate 109h is placed in the same plane as the third sealing part 107 at the front edge of the third sealing part 107.

The other points and the effects in the assembled battery 100h according to this embodiment are the same as those of the seventh embodiment, and the description thereof is omitted. While the heat dissipation effect is reduced, the density of the power generation element in the stacking direction is higher and the volumetric efficiency is more improved compared with the seventh embodiment. Note that, although the film-covered batteries 101b as shown in FIGS. 6 and 7 are stacked to form the assembled battery 100h in FIG. 13, the film-covered batteries as shown in FIG. 10 may be stacked instead. Further, in this embodiment, every N number (N is an integer of 2 or above) of film-covered batteries 101b may be flipped vertically and stacked so that the third sealing parts 107 face each other in a certain part. In this case also, one heat dissipation plate 109g is placed between each pair of adjacent film-covered batteries 101b.

Ninth Embodiment

Figure 14:
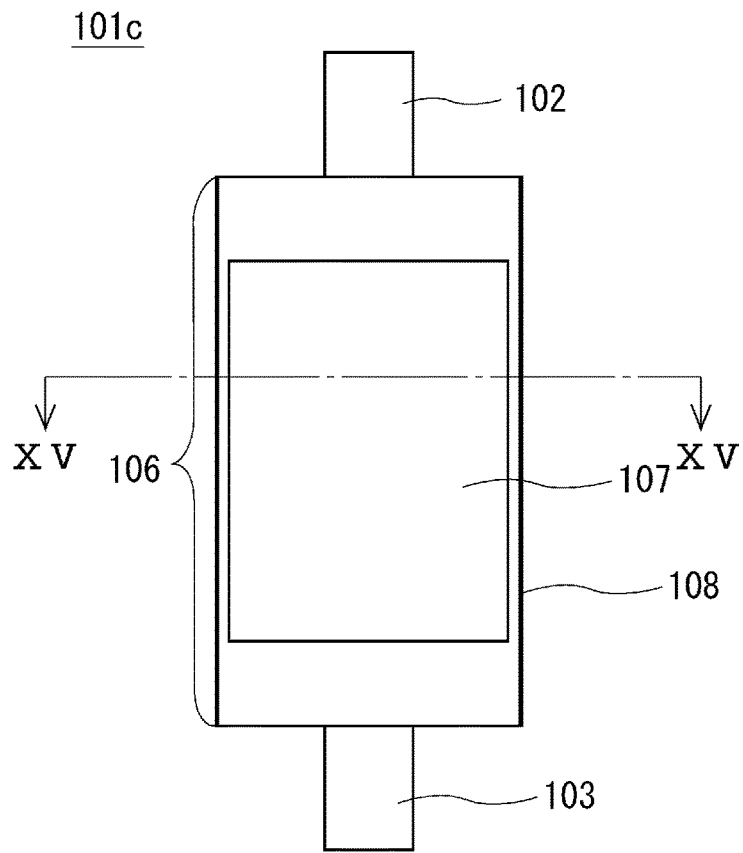
FIG. 14 is a plan view showing an example structure of a film-covered battery included in an assembled battery according to a ninth embodiment.

Prior to describing an assembled battery according to a ninth embodiment, a film-covered battery included in this assembled battery is described hereinafter with reference to FIGS. 14 and 15. FIG. 14 is a plan view showing an example structure of the film-covered battery included in the assembled battery according to the ninth embodiment, and FIG. 15 is a cross-sectional view along line XV-XV in FIG. 14.

Figure 15:
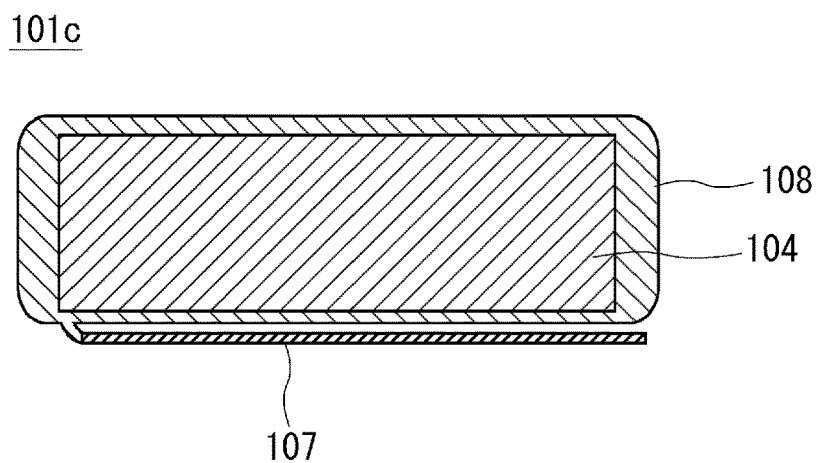
FIG. 15 is a cross-sectional view along line XV-XV showing an example structure of the film-covered battery shown in FIG. 14.

As shown in FIGS. 14 and 15, in a film-covered battery 101c included in the assembled battery according to this embodiment, the second sealing part 106 is formed in a large part of one face with the maximum area of the power generation element 104 in the film covering material 108. The film-covered battery 101c is different from the film-covered battery 101b shown in FIGS. 6 and 7 in this point. The other points and the effects in the film-covered battery 101c according to this embodiment are the same as those of the film-covered battery 101b according to the third embodiment. For example, in this embodiment, a structure where the reverse side and the front side of the film covering material 108 are bonded together may be used as in the example structure shown in FIG. 2. Note that, in FIG. 14, the first sealing part 105 is hidden behind the second sealing part 106, and the power generation element 104, which is indicated by a dotted line in FIG. 1 or the like, is hidden behind the third sealing part 107.

The large part mentioned above is described hereinafter. Particularly, in this embodiment, a sealing area of the third sealing part 107 (which is a part of the second sealing part 106 and overlapping the power generation element 104) is 80% or more of the area of one face with the maximum area of the power generation element 104. This sealing area is preferably 90% or more of the area of the one face, and more preferably 94% or more of the area of the one face.

Because the third sealing part 107 overlaps the power generation element 104, the sealing area is an area that is 100% or less of the area of the one face. Thus, this sealing area is preferably 80% or more and 100% or less of the area of the one face, more preferably 90% or more and 100% or less of the area of the one face, and further preferably 94% or more and 100% or less of the area of the one face.

When the sealing area of the third sealing part 107 is an area that is 100% or less of the area of the one face, this sealing area is equal to or smaller than the maximum area in one face having the maximum area among the exterior faces of the film-covered battery 101c. Thus, the third sealing part 107 has a size equal to or smaller than one face having the maximum area among the exterior faces of the film-covered battery 101c.

Figure 16:
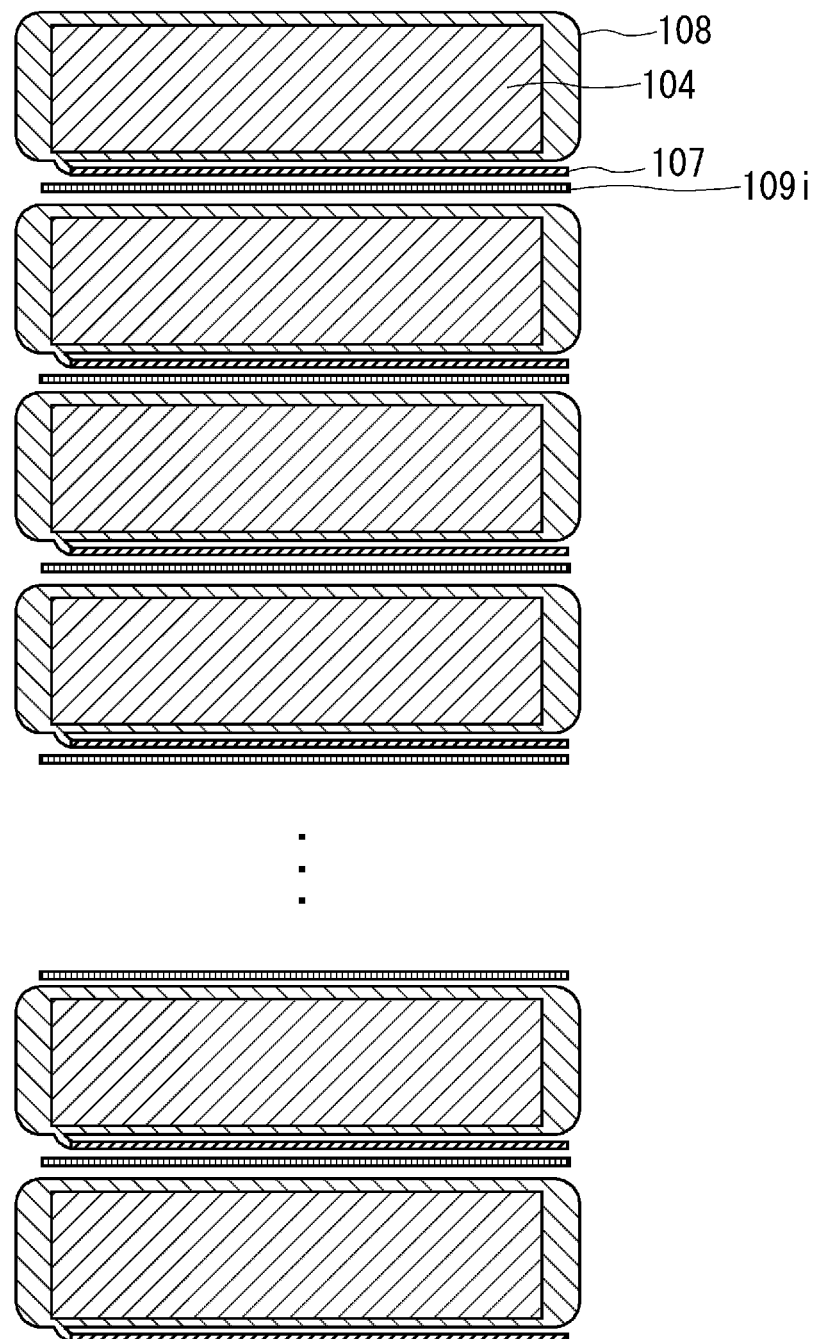
FIG. 16 is a cross-sectional view showing an example structure of the assembled battery according to the ninth embodiment.

The assembled battery according to this embodiment is described hereinafter with reference also to FIG. 16. FIG. 16 is a cross-sectional view showing an example structure of the assembled battery according to the ninth embodiment, and it is a cross-sectional view showing an example structure of the assembled battery in which a plurality of film-covered batteries 101c in FIGS. 14 and 15 are stacked together.

As shown in FIG. 16, in an assembled battery 100i according to this embodiment, the film-covered batteries 101c in FIGS. 14 and 15 are stacked instead of the film-covered batteries 101b, and a heat dissipation plate 109i is placed instead of the heat dissipation plate 109h in the eighth embodiment shown in FIG. 13. The other points in the assembled battery 100i according to this embodiment are the same as the assembled battery according to the eighth embodiment, and the description thereof is partly omitted; however, various examples described in the eighth embodiment are applicable as appropriate.

The heat dissipation plate 109i is placed to mostly overlap the third sealing part 107, and their areas are substantially the same or the heat dissipation plate 109i is larger. Thus, the area ratio described regarding the third sealing part 107 can be applied in the same manner in the heat dissipation plate 109i, and the projection area of them can be also applied in the same manner because they overlap each other.

According to this embodiment, while the density of the power generation element in the stacking direction is lower and the volumetric efficiency is degraded compared with the eighth embodiment, the heat dissipation effect is higher. Note that, in FIG. 16, every two film-covered batteries 101c may be flipped vertically and stacked so that the third sealing parts 107 face each other in a certain part. In this case also, one heat dissipation plate 109i is placed between each pair of adjacent film-covered batteries 101c.

Tenth Embodiment

Figure 17:
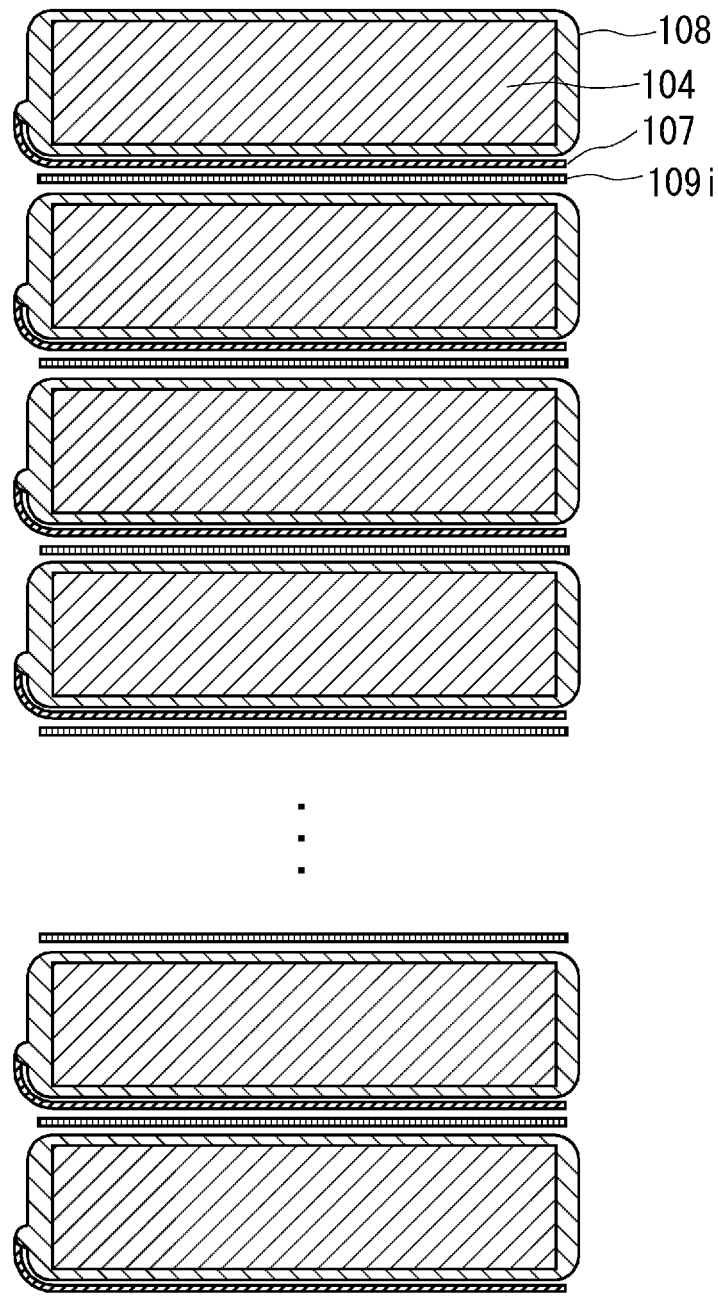
FIG. 17 is a cross-sectional view showing an example structure of an assembled battery according to a tenth embodiment.

FIG. 17 is a cross-sectional view showing an example structure of an assembled battery according to a tenth embodiment. As shown in FIG. 17, an assembled battery 100j according to this embodiment is different from the assembled battery 100i according to the ninth embodiment in that the film-covered battery 101c shown in FIGS. 14 and 15 is modified as follows.

Specifically, a plan view of the film-covered battery 101c according to this embodiment is as shown in FIG. 14, and a cross-sectional view thereof is as shown in FIG. 10. To be more specific, in the film-covered battery 101c according to this embodiment, the second sealing part 106 begins at the lateral face of the power generation element 104 (one of the faces not having the maximum area) and is placed along the power generation element 104. Further, in the film-covered battery 101c according to this embodiment, the same sides of the film covering material 108 are bonded together in the lateral face and the one face with the maximum area of the power generation element 104.

The other points and the effects in the assembled battery 100j according to this embodiment are the same as those of the ninth embodiment, and the description thereof is omitted. This embodiment has the effect that, when the film-covered battery 101c is stacked, a beginning point of bonding does not interfere with the stacking, thereby achieving higher density.

Eleventh Embodiment

Figure 18:
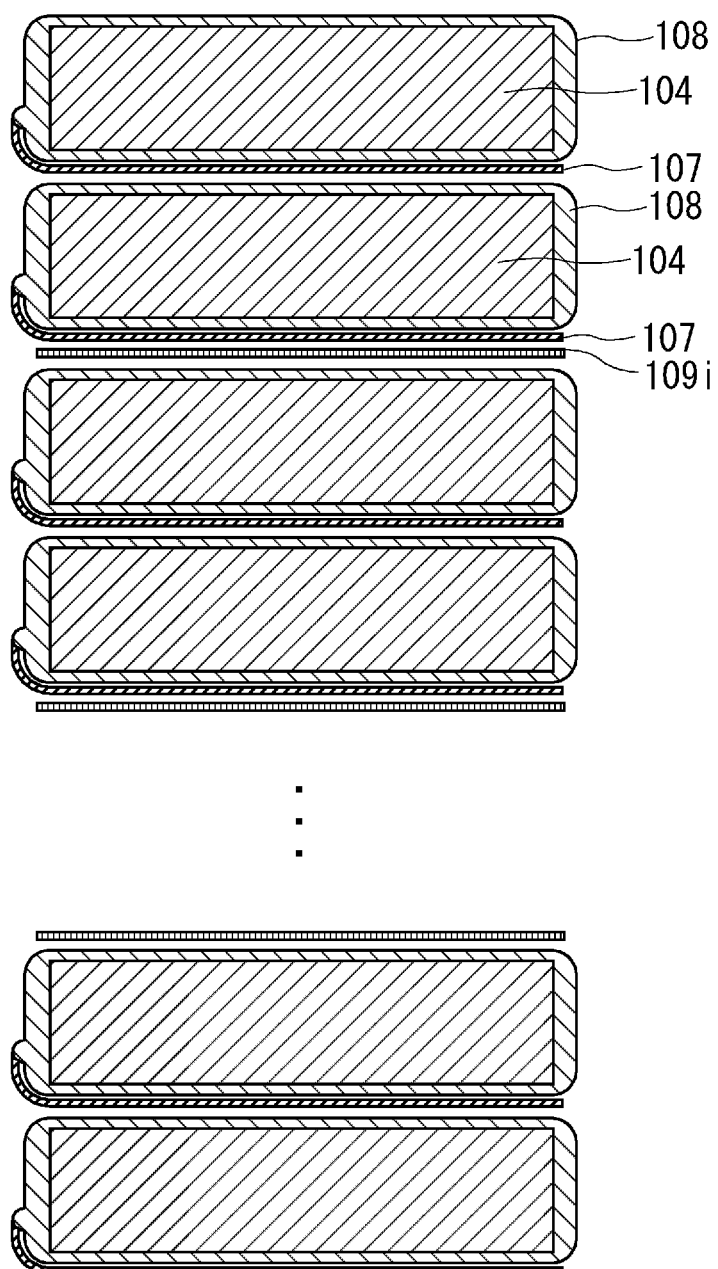
FIG. 18 is a cross-sectional view showing an example structure of an assembled battery according to an eleventh embodiment.
Figure 19:
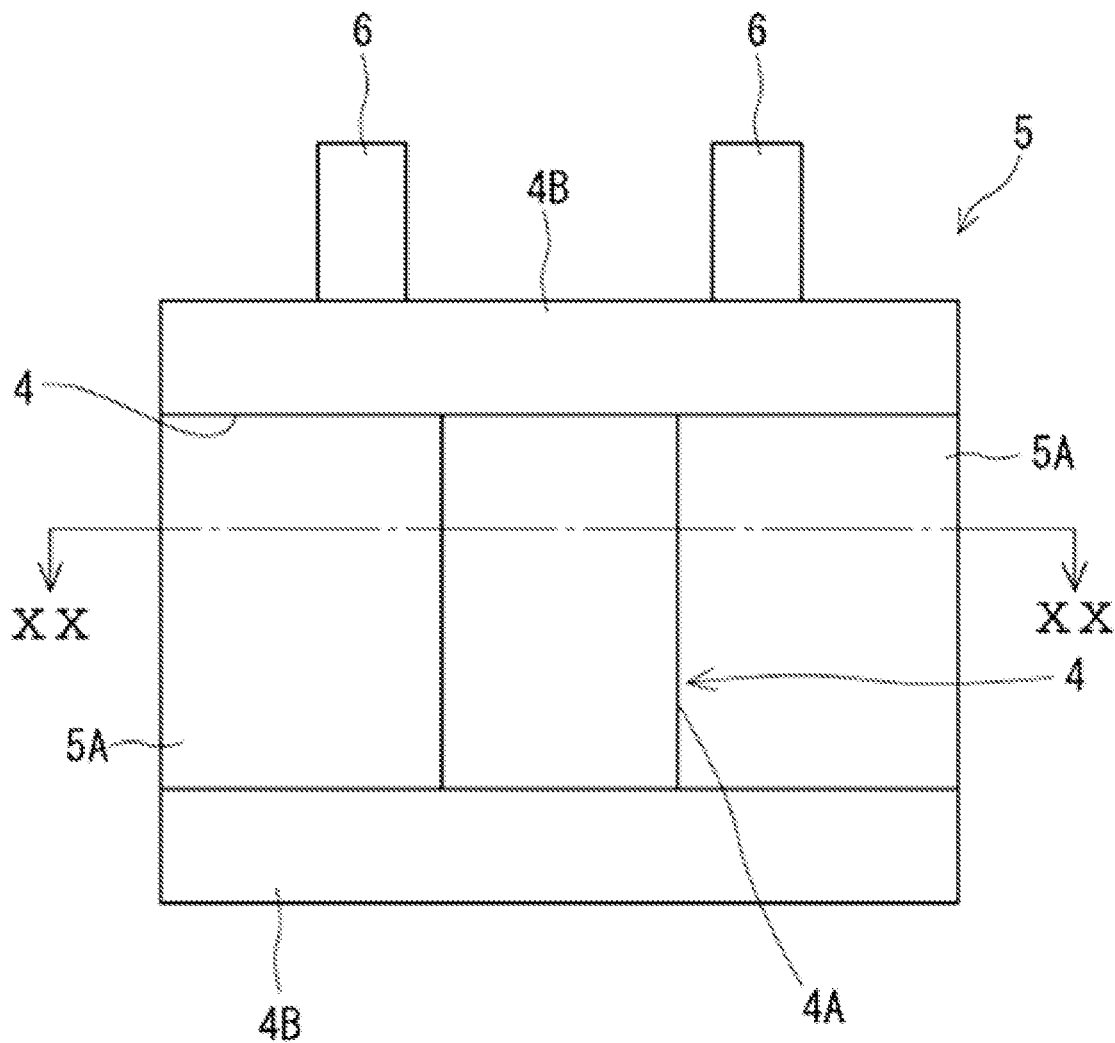
FIG. 19 is a plan view showing a structure of a film-covered battery disclosed in Japanese Unexamined Patent Application Publication No. H10-214606.
Figure 20:
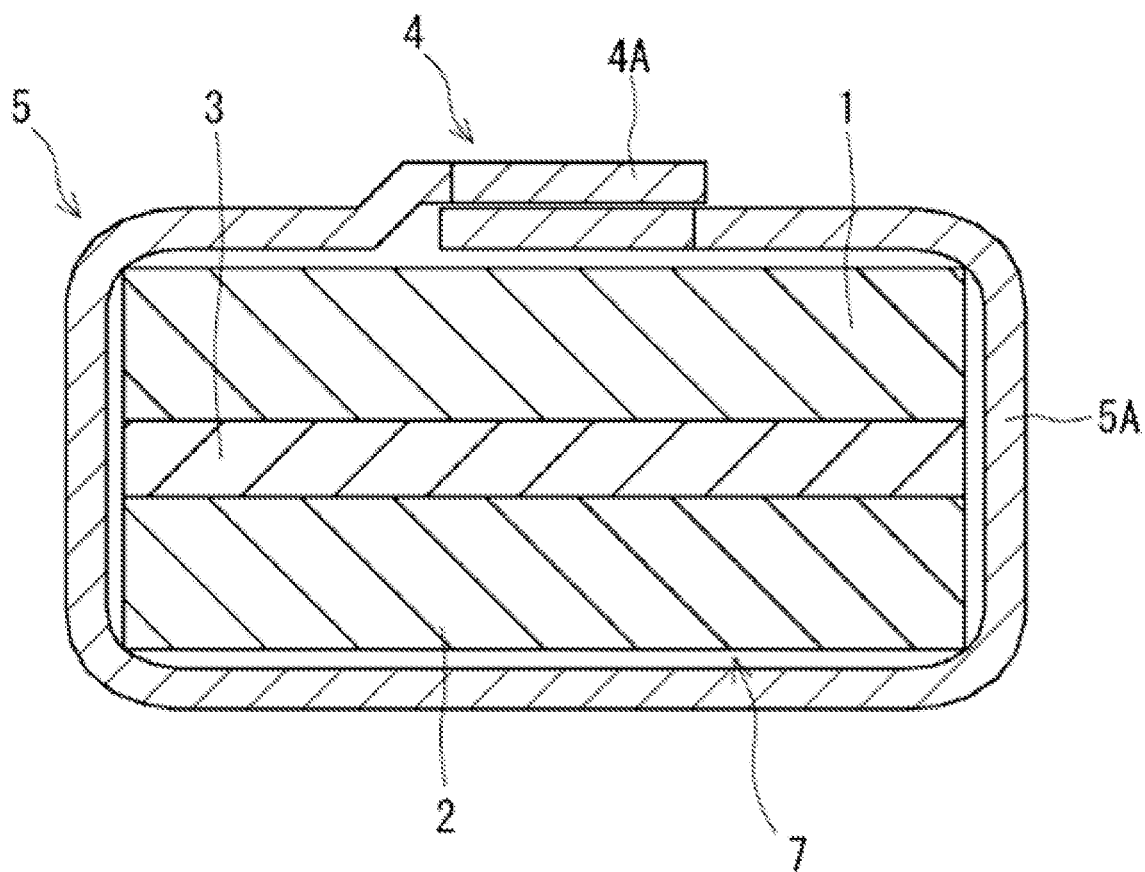
FIG. 20 is a cross-sectional view along line XX-XX of the film-covered battery shown in FIG. 19.

FIG. 18 is a cross-sectional view showing an example structure of an assembled battery according to an eleventh embodiment. As shown in FIG. 18, an assembled battery 100k according to this embodiment is different from the assembled battery 100j according to the tenth embodiment in that the heat dissipation plates 109i is placed not for every film-covered battery 101c but for every two film-covered batteries 101c.

The other points and the effects in the assembled battery 100k according to this embodiment are the same as those of the eleventh embodiment, and the description thereof is omitted. While the heat dissipation effect is reduced, the density of the power generation element in the stacking direction is higher and the volumetric efficiency is further improved compared with the tenth embodiment. Note that, although an example in which the heat dissipation plates 109i is placed for every two film-covered batteries is described, it may be placed for every N number of film-covered batteries. Further, although not shown, the heat dissipation plates 109i may be placed for every N number of film-covered batteries in the assembled battery 100i according to the ninth embodiment, just like in this embodiment.

Example

The above-described various embodiments are described using examples and comparative examples below.

For a positive electrode, a mixture of $LiNi_{0.8}Co_{0.15}Al_{0.05}O_2$ as a positive-electrode active material, carbon black for conductivity imparting agent, and polyvinylidene fluoride (PVDF) as a binder at a ratio of 94:3:3 was used. For a negative electrode, a mixture of surface-coating graphite as a negative-electrode active material, carbon black for conductivity imparting agent, and PVDF as a binder at a ratio of 96:1:3 was used. For a separator, a porous separator made of polypropylene was used. Further, a stack of 10 layers of alternate positive and negative electrodes with the separator interposed therebetween was used as the power generation element.

This was put into a coverage case made of a film covering material and sealed, and thereby a film-covered battery was obtained. A form of sealing was made to correspond to each form of a film-covered battery according to each embodiment and comparative example. For the film-covered battery in FIG. 3 according to the first embodiment, FIG. 10 according to the fifth embodiment, FIG. 4 according to the first embodiment and FIG. 10 according to the fifth embodiment, the third sealing part was made to occupy 50% of the maximum area of the power generation element. For FIGS. 14 and 15 according to the ninth embodiment and FIG. 16 according to the ninth embodiment, the third sealing part was made to occupy 100% of the maximum area of the power generation element. Further, an assembled battery of a film-covered battery in FIG. 16 according to the ninth embodiment and in the comparative example is composed of four film-covered batteries stacked together.

The area of a face with the maximum area of the power generation element (which is referred to hereinafter as "one face") was 130 mm×70 mm, and the capacity maintenance rate after 200 cycles at a temperature of 45° was measured with or without application of pressure on the face having the maximum area for the shape of each embodiment.

TABLE 1

| Embodiment | Pressure | Capacity maintenance rate After 200 Cycles at 45° (%) Area of Face With Maximum Area of Power Generation Element (mm²) | | | | | |
|---|---|---|---|---|---|---|---|
| | | 130 *70 | 200 *100 | 200 *200 | 400 *100 | 600 *100 | 800 *100 |
| 1 (FIG. 3) | Applied | 76 | 76 | 75 | 74 | 72 | 71 |
| | No | 77 | 76 | 74 | 71 | — | — |
| 5 (Film-covered battery in FIG. 10) | Applied | 78 | 77 | 77 | 76 | 74 | 71 |
| | No | 76 | 76 | 76 | 73 | — | — |
| 9 (FIG. 14, 15) | Applied | 82 | 82 | 82 | 82 | 81 | 79 |
| | No | 78 | 77 | 74 | 74 | — | — |
| 1 (FIG. 4) | Applied | 80 | 80 | 81 | 80 | 80 | 79 |
| | No | 77 | 76 | 75 | 73 | — | — |
| 5 (FIG. 10) | Applied | 82 | 83 | 80 | 81 | 80 | 79 |
| | No | 75 | 76 | 74 | 72 | — | — |
| 9 (FIG. 16) | Applied | 83 | 81 | 81 | 82 | 81 | 82 |
| | No | 78 | 75 | 73 | 71 | — | — |
| Comparative Example | Applied | 75 | — | — | 70 | — | — |
| | No | 76 | — | — | 71 | — | — |
| Comparative Stack Example | Applied | 73 | — | — | 68 | — | — |
| | No | 72 | — | — | 67 | — | — |

Results in a single film-covered battery are discussed first.

The case where the area size of a face with the maximum area of the power generation element is the same, "130 mm×70 mm", is described as an example. In the case of not applying pressure, no significant difference was found in capacity maintenance rate among the film-covered battery in FIG. 3 according to the first embodiment, FIG. 10 according to the fifth embodiment, and FIGS. 14 and 15 according to the ninth embodiment, which means that a difference depending on the structure of each embodiment is small.

On the other hand, in the case of applying pressure (FIGS. 14 and 15 according to the ninth embodiment), the third sealing part uniformly applied pressure to 100% of the face with the maximum area of the power generation element, and therefore the power generation element was maintained uniformly, which was likely to contribute to improving battery performance.

Results in an assembled battery (FIG. 4 according to the first embodiment, FIG. 10 according to the fifth embodiment, and FIG. 16 according to the ninth embodiment) are discussed next.

The case where the area size of a face with the maximum area of the power generation element is the same, "130 mm×70 mm", is described as an example. In the case of not applying pressure, no significant difference was found in capacity maintenance rate, which means that a difference depending on the structure of each embodiment is small.

On the other hand, in the case of applying pressure, pressure was uniformly applied to 100% of the face with the maximum area of the power generation element, and therefore the power generation element was maintained uniformly, which was likely to contribute to improving battery performance.

A difference depending on the area of a face with the maximum area of the power generation element is discussed next.

With reference to FIG. 4 in the first embodiment, in the case of not applying pressure, the capacity maintenance rate tends to decrease as the area of the face with the maximum area of the power generation element increases. Such tendency is likely to be caused by a structural feature that the film-covered battery reduces the atmospheric pressure inside the coverage case, and the shape of the film-covered battery is maintained by external pressure. Specifically, the possible cause of this tendency is that an increase in the area of the face with the maximum area of the power generation element due to the above feature leads to less shape retention.

On the other hand, in the case of applying pressure, shape retention is ensured by reliably applying pressure to the area of the face with the maximum area of the power generation element, which allows effects to be obtained regardless of the area of the face with the maximum area of the power generation element. Such results showed that the effect of applying pressure is higher as the area of the face with the maximum area of the power generation element is larger. The area of one face with the maximum area of the power generation element is preferably 20000 mm2 or more.

A difference depending on the ratio (aspect ratio) of the lengths of two sides at right angles of the area of a face with the maximum area of the power generation element is discussed next.

Comparison was made on the case where the area of the face with the maximum area is the same and the ratio of the lengths of two sides at right angles is different: "200 mm×200 mm" and "400 mm×100 mm". As a result, in the case of not applying pressure, the capacity maintenance rate tends to decrease more significantly when the ratio of the lengths of two sides is larger, i.e., "400 mm×100 mm", even with the same area. In the case of applying pressure, on the other hand, the high capacity maintenance rate is obtained for both of "200 mm×200 mm" and "400 mm×100 mm". Such results showed that the improvement effect by pressure application is higher in a shape with a different ratio of two sides at right angles. It is preferable that the aspect ratio of one face with the maximum area of the power generation element is 1:K (K≥4).

Then, a film-covered battery where the area of the face with the maximum area of the power generation element is "400 mm×100 mm and the percentage that the third sealing part covers the area of the face with the maximum area of the power generation element is varied was prepared. Then, the capacity maintenance rate after 200 cycles at a temperature of 45° was measured with application of pressure on the face with the maximum area of the power generation element was measured for each of the single film-covered battery and the assembled battery. Table 2 shows results for the film-covered battery, and Table 3 shows results for the assembled battery.

TABLE 2

| | Capacity maintenance rate After 200 Cycles at 45° (%) Percentage of Coverage by Third Sealing Part over Area of Face with Maximum Area of Power Generation Element (%) | | | | | | | | | |
|---|---|---|---|---|---|---|---|---|---|---|
| Embodiment | 35 | 40 | 45 | 47 | 50 | 70 | 80 | 90 | 94 | 100 |
| 1 (FIG. 3) | 69 | 73 | 73 | 74 | 73 | — | — | — | — | — |
| 5 (Film-covered battery in FIG. 10) | 69 | 74 | 72 | 75 | 76 | — | — | — | — | — |
| 9 (FIG. 14, 15) | — | — | — | — | — | — | 79 | 81 | 81 | 82 |

TABLE 3

| | Capacity maintenance rate After 200 Cycles at 45° (%) Percentage of Coverage by Third Sealing Part over Area of Face with Maximum Area of Power Generation Element (%) | | | | |
|---|---|---|---|---|---|
| Embodiment | 70 | 80 | 90 | 94 | 100 |
| 1 (FIG. 4) | 75 | 79 | 79 | 80 | 82 |
| 5 (FIG. 10) | 75 | 79 | 80 | 81 | 81 |
| 9 (FIG. 16) | — | 80 | 81 | 81 | 82 |

Table 2 shows that, when pressure is applied to the single film-covered battery, the capacity maintenance rate was lower than that when pressure is not applied if the percentage of the face with the maximum area of the power generation element to which pressure is applied is 35%.

As for the assembled battery, two film-covered batteries are flipped upside down so that the third sealing parts are placed in the same plane in FIG. 4 according to the first embodiment and FIG. 10 according to the fifth embodiment. Thus, Table 3 shows the percentage of the area of the face with the maximum area of the power generation element which is covered by the third sealing part at the boundary of the two adjacent film-covered batteries in FIG. 4 according to the first embodiment and FIG. 10 according to the fifth embodiment. It is found from Table 3 that the capacity maintenance rate of the assembled battery is improved when pressure is applied with 80% or more coverage over the area of the face with the maximum area of the power generation element.

Although examples without the heat dissipation plate are described above, substantially the same effects regarding the pressed region or the like are obtained in the case of using the heat dissipation plate simply having substantially the same area as the third sealing part as described in the ninth to eleventh embodiments. In the case of using the heat dissipation plate instead of or in addition to the third sealing part in the first to eighth embodiments also, substantially the same effects as in the above-described examples are obtained regarding the pressed region or the like. Thus, even when the sealing area of the third sealing part is replaced with the projection area of both of the third sealing part and the heat dissipation plate in the first to eighth embodiments, substantially the same effects as in the above-described examples are obtained in terms of the pressed region or the like. Therefore, by placing the heat dissipation plates in each of the embodiments described above, it is possible to obtain the heat dissipation effect in addition to the effects described in the example.

Other Embodiments

Although the third sealing part seals the whole thing in each of the embodiments described above, the sealing part may be placed intermittently. For example, FIGS. 1, 6 and 14 show that the second sealing part 106 and the third sealing part 107, which is a part of the second sealing part 106, seal the whole of the side where terminals are not guided. However, this sealing is not particularly restricted as long as a sealing width is enough to maintain the performance of the film-covered battery, and the film covering material 108 may extend to the outside of the sealing part, or sealing may be done in a fragmented form, for example.

Further, although an example in which the power generation element has a rectangular shape is described in each of the embodiments described above, it is not limited thereto, and the power generation element may have another shape such as a polyhedron, or a certain face may be non-planar, for example. In order to improve the volumetric efficiency, however, it is preferred that at least two faces having the maximum area are parallel to each other, and it is further preferred that those two faces are planar surfaces parallel to each other.

Further, although the first sealing part is placed at both ends of the film-covered battery, and the first terminal and the second terminal are guided from the respective ends in each of the embodiments described above, the both terminals may be guided from one end.

Although it is assumed that the second sealing part is formed on one face having the maximum area among the exterior faces of the power generation element, in the case where there are two or more faces having the maximum area, the second sealing part is formed on at least one face having the maximum area among the exterior faces of the power generation element. Thus, the second sealing part may be formed on two or more faces having the maximum area among the exterior faces of the power generation element. In this case, the above description is applicable by replacing "one face" with "at least one face" in each of the embodiments described above. Note that, however, because a stack height increases when producing an assembled battery by stacking film-covered batteries, the second sealing part is preferably formed on one face as described in each embodiment.

Further, in the case where there are two or more faces having the maximum area among the exterior faces of the power generation element, the sealing area of the third sealing part may be equal to or less than, or more than, the maximum area of one face having the maximum area among the exterior faces of the power generation element. In the latter case, when the third sealing part is formed on two or more faces, it may be larger than one face having the maximum area among the exterior faces of the power generation element.

Although the identical film-covered batteries are used in the assembled battery in each of the embodiments described above, the assembled battery may be formed using film-covered batteries with different combinations of polarity (positive and negative) of the first terminal and the second terminal or in a plurality of different shapes.

Further, in the case of replacing a particular degraded film-covered battery in the assembled battery, it is possible to visually check it by changing the appearance of a changed film-covered battery.

The present disclosure may include a manufacturing method for an assembled battery that manufactures an assembled battery by stacking a plurality of film-covered batteries. In this assembled battery manufacturing method, a manufacturing method for a film-covered battery is not particularly limited as long as the film-covered battery according to various embodiments described above can be manufactured.

The above-described manufacturing method for an assembled battery places a heat dissipation plate on at least one face having the maximum area among the exterior faces of the power generation element, on which the third sealing part is formed. At this time, the heat dissipation plate is placed in such a way that the projection area of the third sealing part and the heat dissipation plate on the at least one face with the maximum area is 40% or more of the area of the at least one face with the maximum area. The third sealing part is a part of the second sealing part, which overlaps the power generation element. Other application examples are as described in each embodiment, and the description thereof is omitted.

According to the present disclosure, there are provided an assembled battery and a manufacturing method for the same that, in the assembled battery including film-covered batteries stacked in layers, achieve good heat dissipation and high energy density with improved volumetric efficiency while fixing the film-covered batteries in a right way.

Note that the present disclosure is not limited to the above-described embodiments and can be modified as appropriate without departing from the spirit and scope of the present disclosure. Further, the present disclosure may be implemented by combining the above-described embodiments with one another.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

The whole or part of the exemplary embodiments disclosed above can be described as, but not limited to, the following supplementary notes.

SUPPLEMENTARY NOTES

Supplementary Note 1

An assembled battery including a plurality of film-covered batteries stacked in layers, wherein
- each of the film-covered batteries includes a coverage case having a film covering material and a power generation element contained in the coverage case,
- the coverage case has a first sealing part that guides a terminal and a second sealing part that does not guide a terminal,
- the second sealing part is formed on at least one face with a maximum area among exterior faces of the power generation element,
- in the assembled battery, where a part of the second sealing part overlapping the power generation element is a third sealing part, a heat dissipation plate is placed on the at least one face with the maximum area among exterior faces of the power generation element, the third sealing part being formed on the at least one face, and a projection area of the third sealing part and the heat dissipation plate onto the at least one face with the maximum area is 40% or more of the at least one face with the maximum area.

Supplementary Note 2

The assembled battery according to Supplementary Note 1, wherein a sealing area of the third sealing part is 40% or more of the at least one face with the maximum area.

Supplementary Note 3

The assembled battery according to Supplementary Note 1 or 2, wherein adjacent film-covered batteries are stacked either in a state where faces having the third sealing part face each other or a state where faces not having the third sealing part face each other.

Supplementary Note 4

The assembled battery according to Supplementary Note 1 or 2, wherein the plurality of film-covered batteries are stacked in such a way that the faces having the third sealing part face in the same direction.

Supplementary Note 5

The assembled battery according to any one of Supplementary Notes 1 to 4, wherein the assembled battery is fixed in a state where 80% or more of the at least one face with the maximum area is pressed by the third sealing part and the heat dissipation plate.

Supplementary Note 6

The assembled battery according to any one of Supplementary Notes 1 to 5, wherein the heat dissipation plate is placed between the adjacent film-covered batteries without overlapping the third sealing part in one of the film-covered batteries.

Supplementary Note 7

The assembled battery according to Supplementary Note 6, wherein a thickness of the heat dissipation plate is substantially the same as a thickness of the third sealing part.

Supplementary Note 8

The assembled battery according to any one of Supplementary Notes 1 to 5, wherein the heat dissipation plate is placed between the adjacent film-covered batteries in such a way that a part of the heat dissipation plate overlaps the whole of the third sealing part in one of the film-covered batteries, and another part of the heat dissipation plate does not overlap the third sealing part in the one of the film-covered batteries.

Supplementary Note 9

The assembled battery according to Supplementary Note 8, wherein a total thickness of the heat dissipation plate and the third sealing part in an overlapping part is substantially the same as a thickness of the heat dissipation plate in a non-overlapping part.

Supplementary Note 10

The assembled battery according to any one of Supplementary Notes 1 to 9, wherein the heat dissipation plate has insulating properties.

Supplementary Note 11

The assembled battery according to any one of Supplementary Notes 1 to 9, wherein the heat dissipation plate is made of metal.

Supplementary Note 12

The assembled battery according to any one of Supplementary Notes 1 to 11, wherein the heat dissipation plate has a plurality of though-holes arranged in parallel on the at least one face with the maximum area.

Supplementary Note 13

The assembled battery according to any one of Supplementary Notes 1 to 12, wherein an area of the at least one face with the maximum area is equal to or larger than 20000 mm2.

Supplementary Note 14

The assembled battery according to any one of Supplementary Notes 1 to 13, wherein an aspect ratio of the at least one face with the maximum area is 1:K (K≥4).

Supplementary Note 15

A manufacturing method for an assembled battery that manufactures the assembled battery by stacking a plurality of film-covered batteries, wherein each of the film-covered batteries includes a coverage case having a film covering material and a power generation element contained in the coverage case, the coverage case has a first sealing part that guides a terminal and a second sealing part that does not guide a terminal, the second sealing part is formed on at least one face with a maximum area among exterior faces of the power generation element, the manufacturing method comprises placing a heat dissipation plate on the at least one face with the maximum area among exterior faces of the power generation element, a third sealing part being formed on the at least one face, the third sealing part being a part of the second sealing part overlapping the power generation element, and a projection area of the third sealing part and the heat dissipation plate onto the at least one face with the maximum area is 40% or more of the at least one face with the maximum area.

The invention claimed is:

1. An assembled battery including a plurality of film-covered batteries stacked in layers, wherein each of the film-covered batteries includes a coverage case having a film covering material and a power generation element contained in the coverage case, the coverage case has a first sealing part that guides a terminal and a second sealing part that does not guide a terminal, the second sealing part is at least partially formed on at least one face with a maximum area among exterior faces of the power generation element, in the assembled battery, where a part of the second sealing part overlapping the power generation element is a third sealing part, at least between some of the layers, a heat dissipation plate is placed on the at least one face with the maximum area, the third sealing part is formed on the at least one face with the maximum area, adjacent film-covered batteries are stacked with faces having the third sealing part and faces not having the third sealing part facing each other the heat dissipation plate is placed between the adjacent film-covered batteries without overlapping the third sealing part in at least one of the film-covered batteries, and the assembled battery meets at least one of following conditions:

a projection area of the third sealing part onto the at least one face with the maximum area is 40% or more of the at least one face with the maximum area;

a projection area of the third sealing part and the heat dissipation plate onto the at least one face with the maximum area is 40% or more of the at least one face with the maximum area; and a projection area of the heat dissipation plate onto the at least one face with the maximum area is 40% or more of the at least one face with the maximum area.

2. The assembled battery according to claim 1, wherein the assembled battery is fixed in a state where 80% or more of the at least one face with the maximum area is pressed by the third sealing part and the heat dissipation plate.

3. The assembled battery according to claim 1, wherein the heat dissipation plate has insulating properties.

* * * * *